United States Patent
Taillon

[15] 3,690,750
[45] Sept. 12, 1972

[54] CONTROL SYSTEM
[72] Inventor: John Kellner Taillon, Massena, N.Y.
[73] Assignee: Bell & Howell Company, Pasadena, Calif.
[22] Filed: Nov. 12, 1970
[21] Appl. No.: 88,633

Related U.S. Application Data
[62] Division of Ser. No. 795,992, Feb. 3, 1969, Pat. No. 3,552,842.

[52] U.S. Cl. ................................................352/124
[51] Int. Cl. ...........................................G03b 23/02
[58] Field of Search .......................242/190; 352/124

[56] References Cited
UNITED STATES PATENTS
2,914,265  11/1959  Vanderwall, Jr. .........242/190
3,318,544  5/1967  Jones, Jr. ...................242/190

*Primary Examiner*—S. Clement Swisher
*Attorney*—Christie, Parker & Hale

[57] ABSTRACT

A control system for a motion picture projection installation having a pair of lengths of motion picture film passed along separate film paths through separate reversible drive means between a pair of reels upon which the films are cowound in reciprocal head-to-tail bifilar relation. The control system includes means for sensing the quantity of film present in one of the film paths between one reel and film display means located intermediate the reels. The control system also includes means for controlling the drive means to maintain said film quantity between predetermined limits.

5 Claims, 16 Drawing Figures

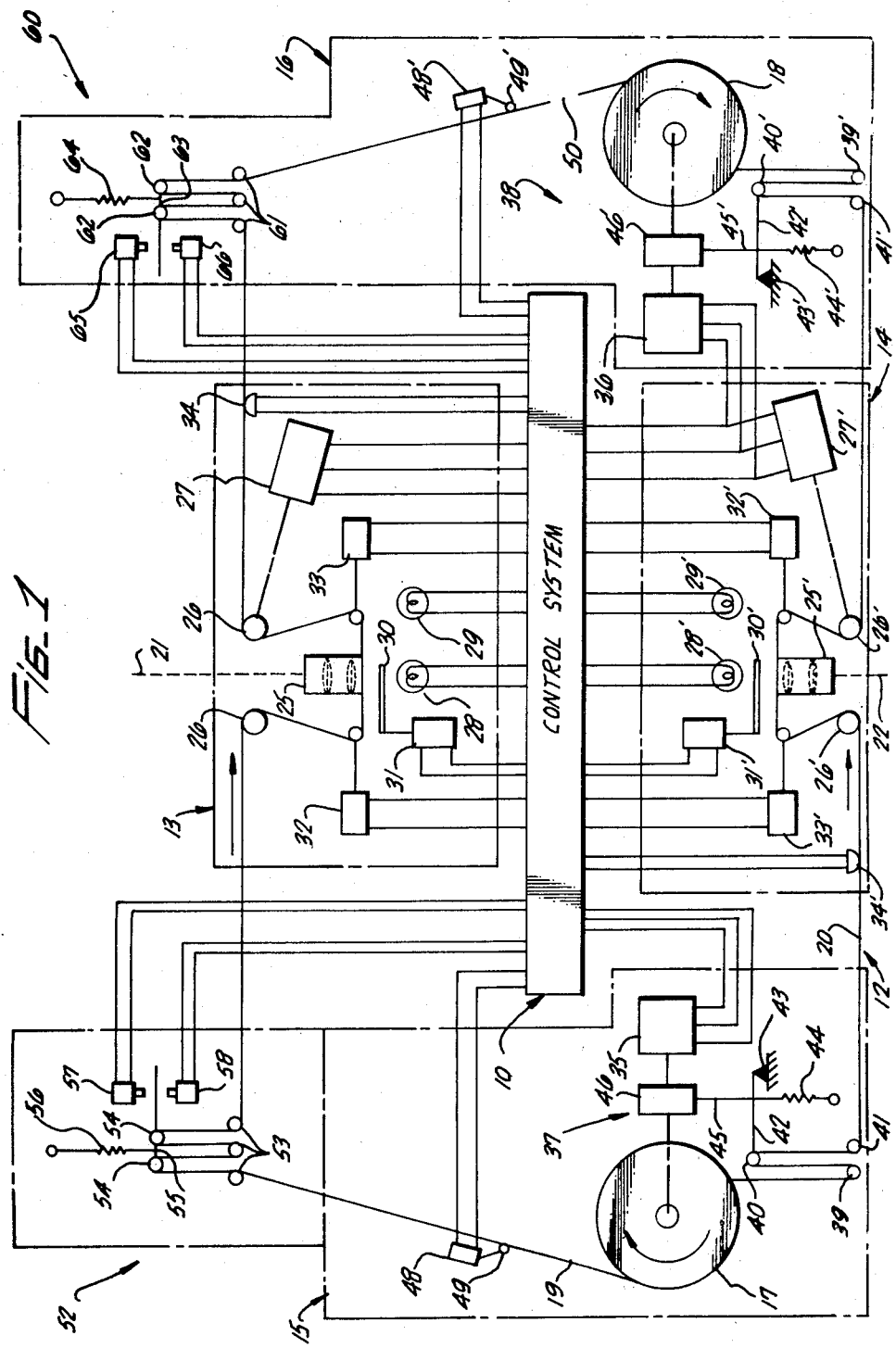

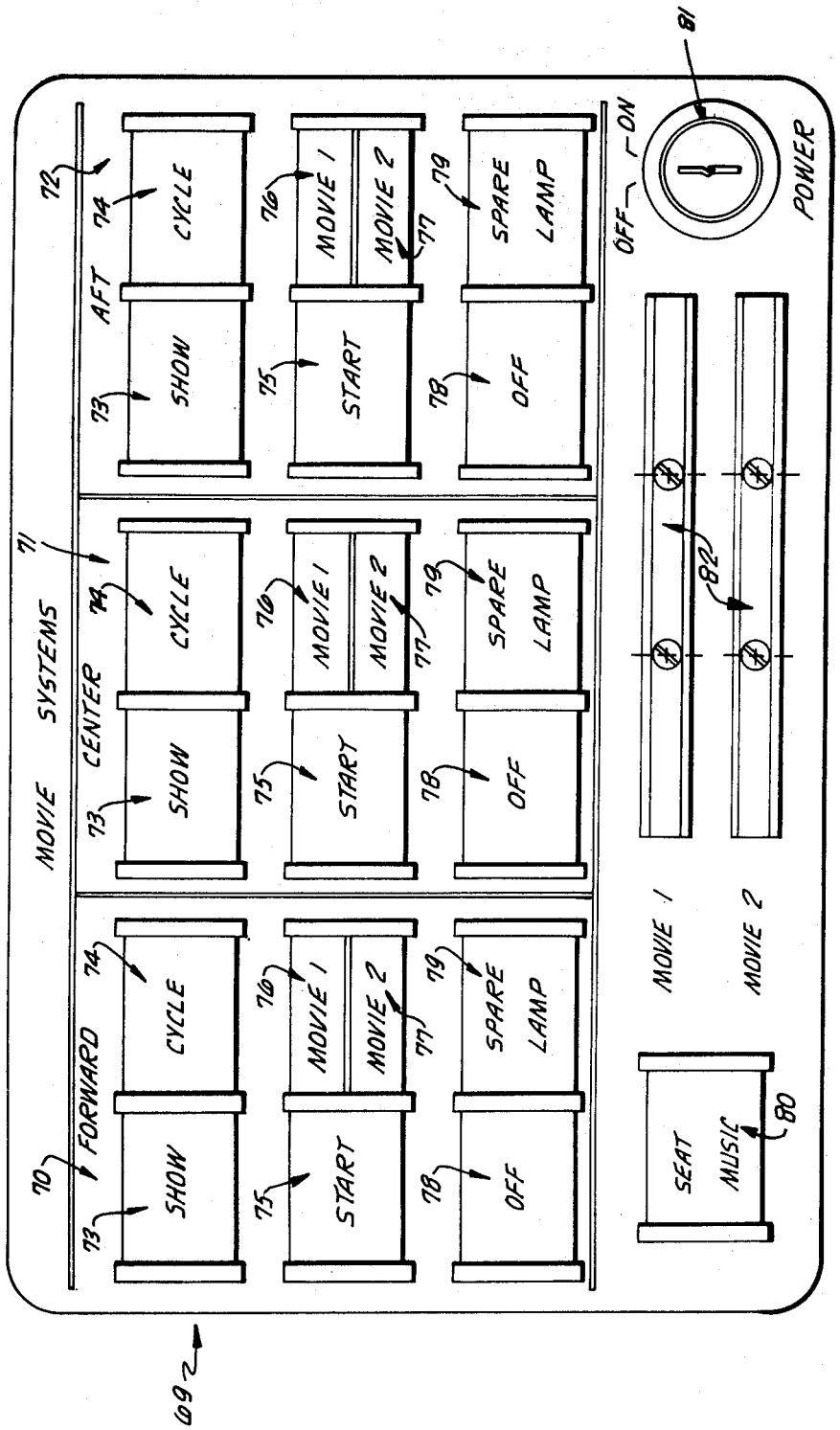

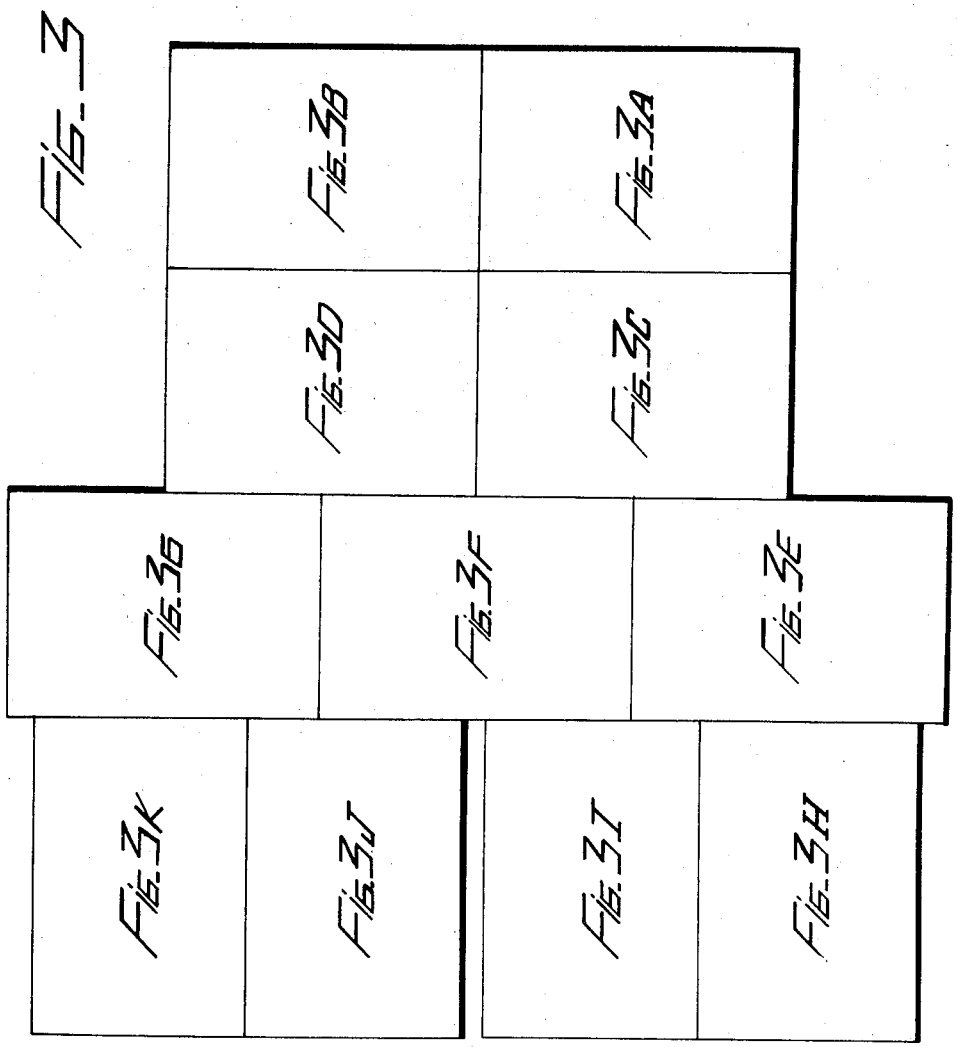

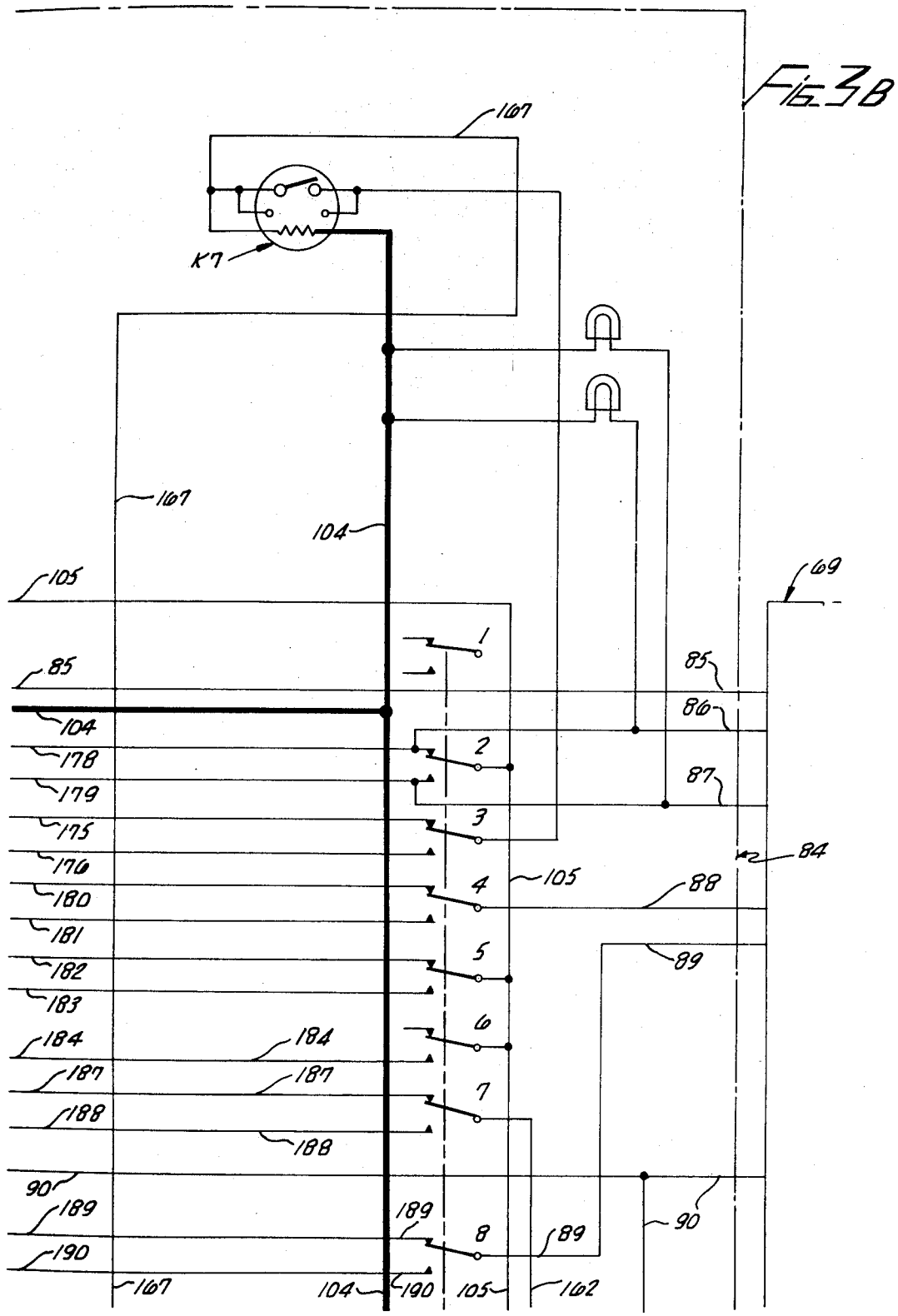

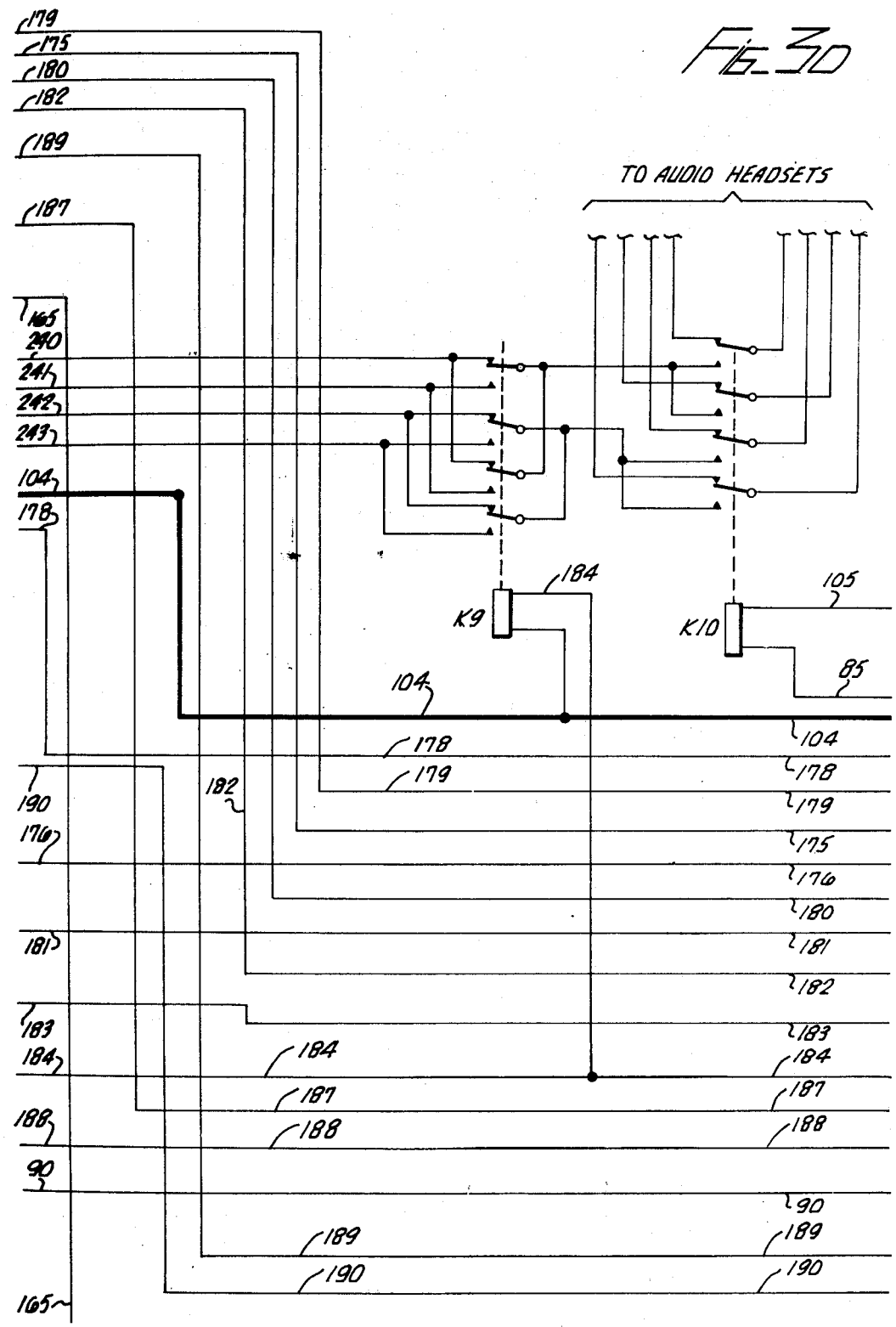

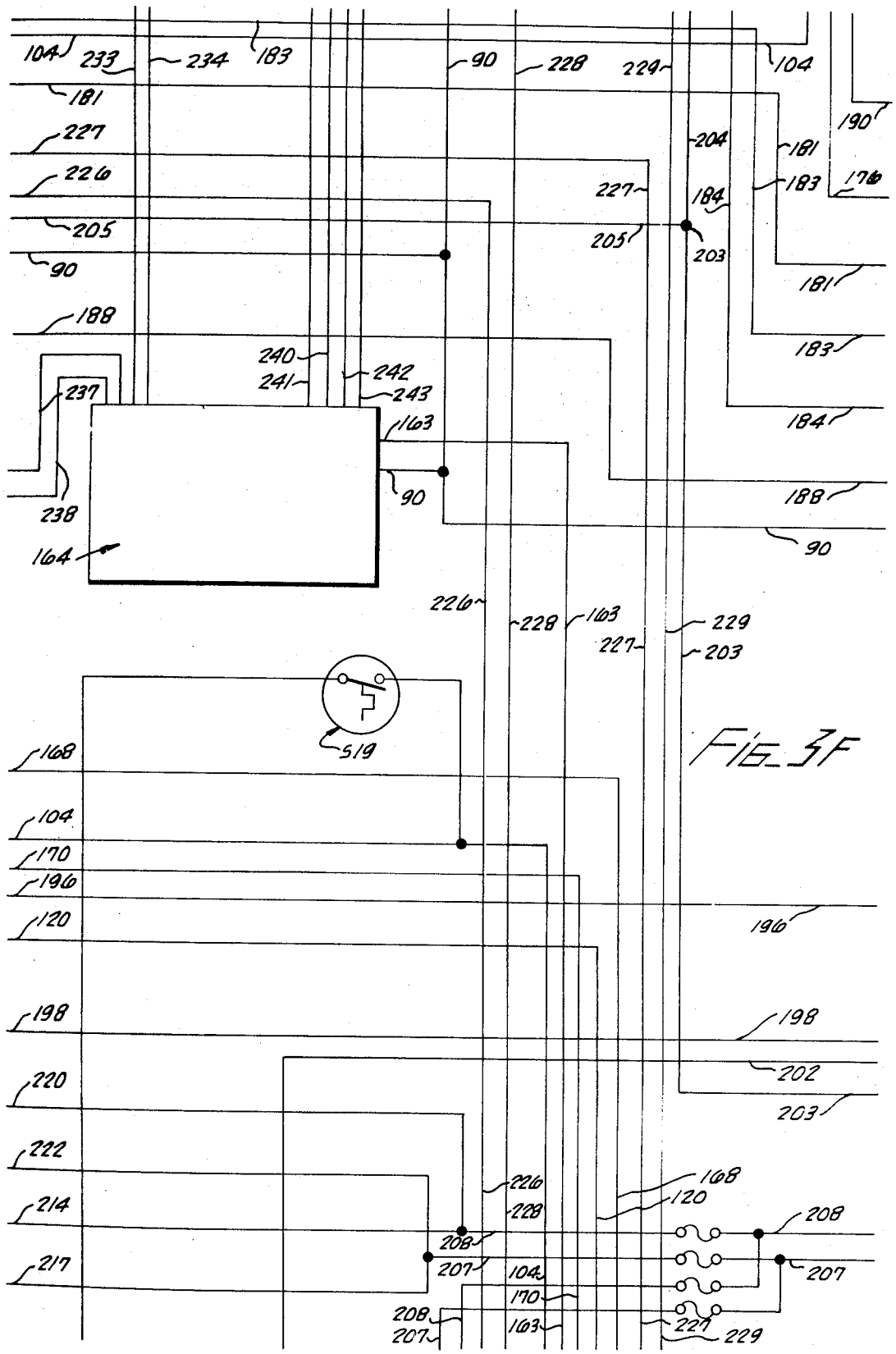

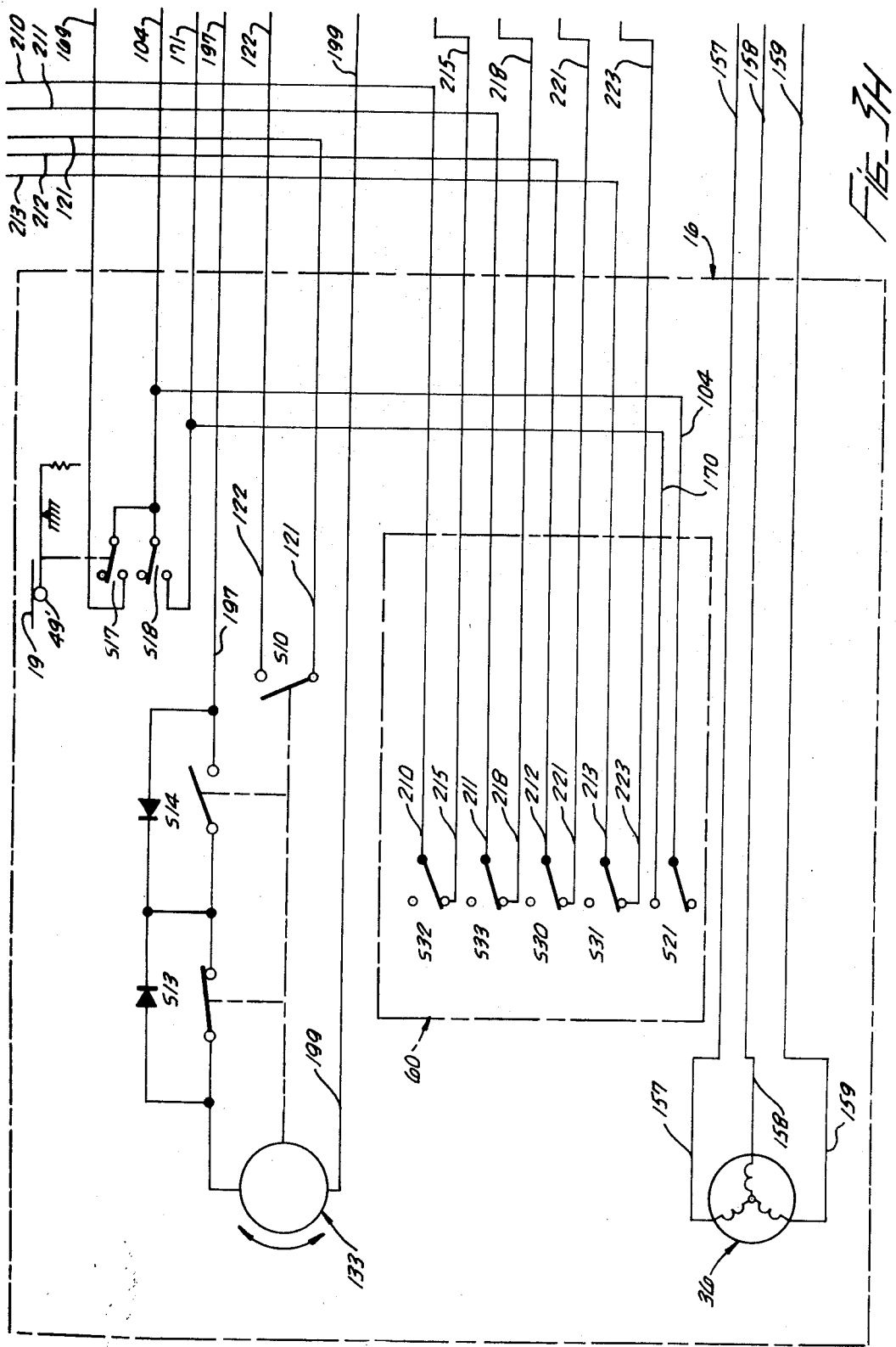

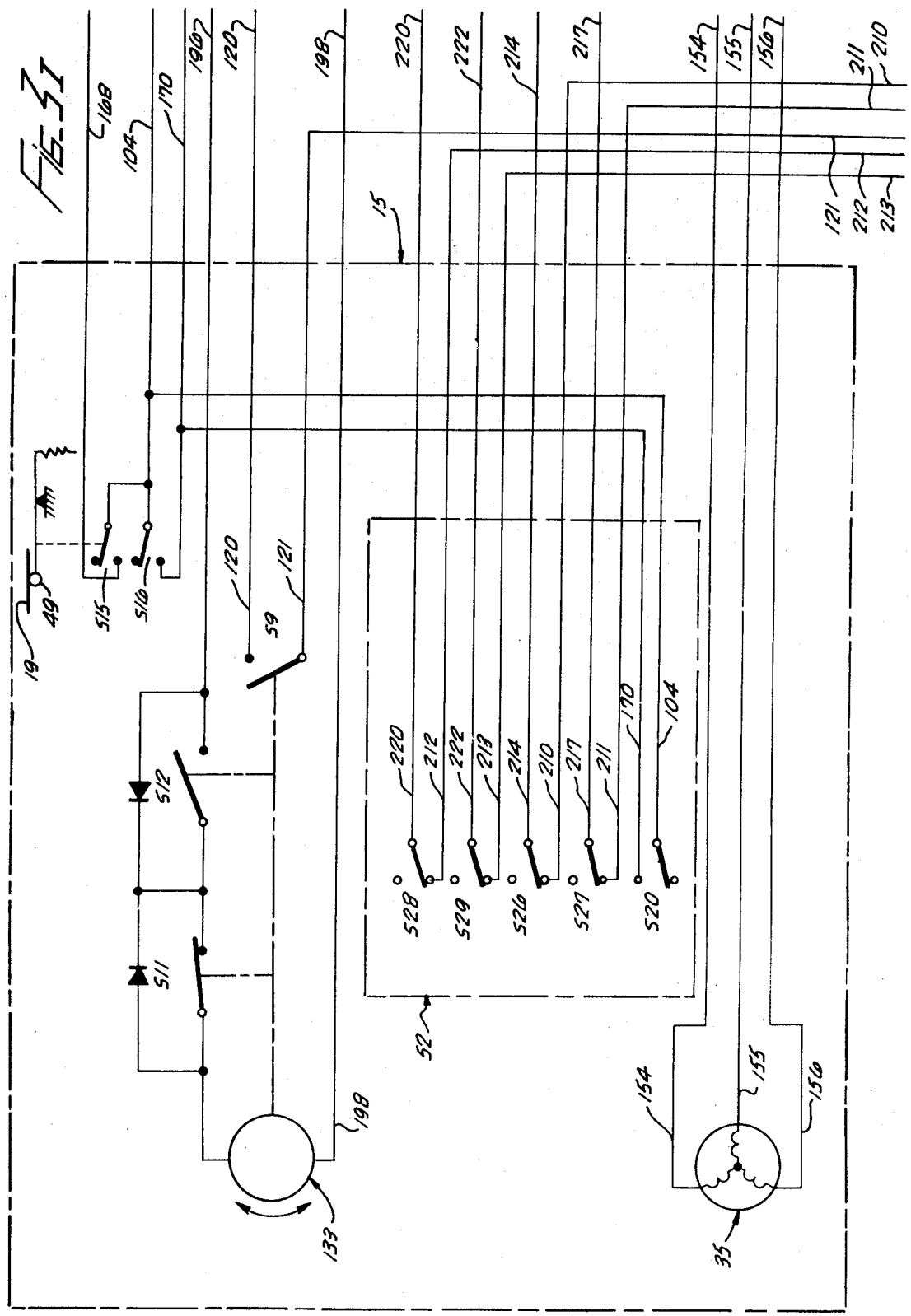

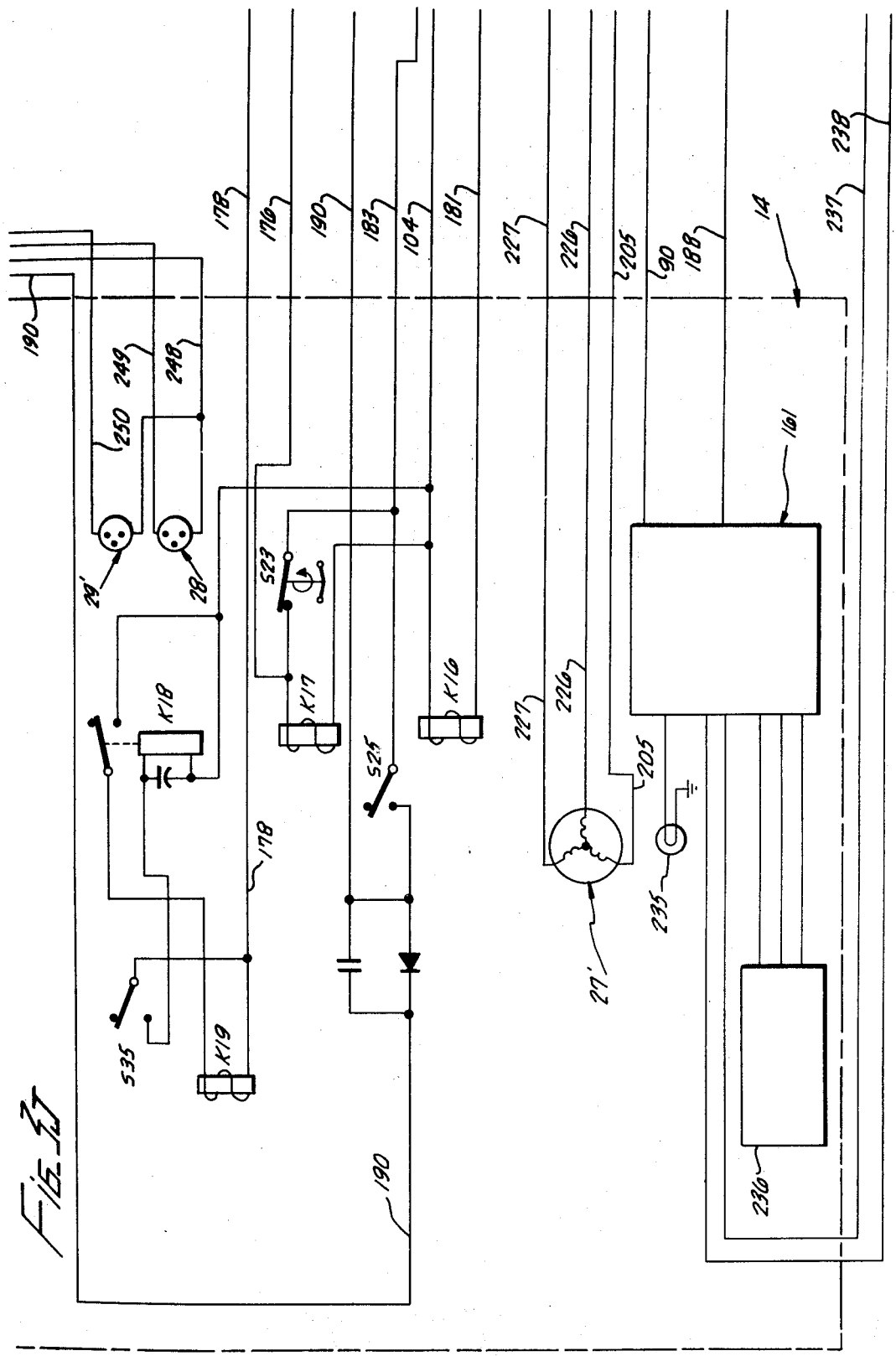

Fig. 3K

CONTROL SYSTEM

CROSS-REFERENCE TO RELATED APPLICATIONS

This is a division of my copending application Ser. No. 795,992, filed Feb. 3, 1969 now U.S. Pat. No. 3,552,842.

FIELD OF THE INVENTION

This invention pertains to electromechanical control systems for regulating the operation of a motion picture projection installation which incorporates a pair of lengths of motion picture film cowound in reciprocal head-to-tail bifilar relation on a pair of reels defining the ends of two separate film paths.

BACKGROUND OF THE INVENTION

U.S. Pat. No. 3,379,488 describes a motion picture display system which has utility in the passenger compartment of commercial aircraft, as well as in classrooms and the like.

So that a motion picture projection system may have enhanced utility in such areas, it is desirable that the projection system be arranged for operation by relatively unskilled personnel such as airline stewardesses or teachers, rather than trained projectionists. Ideally, especially where the projection system is to be used to display a motion picture program of specified content a number of times, it is desirable that the need for rewinding film be minimized, if not altogether eliminated. The elimination of film rewinding is of particular economic significance where a projection system is used in the passenger aircraft of international air carriers; the servicing of such systems for the purposes of film rereeling involves the use of trained personnel which are not normally maintained on the staff of the carrier and which are obtainable in many countries only at premium wages, if at all.

To overcome the problems which, to date, have worked to the economic disadvantage of motion picture projection systems aboard the aircraft of international airlines, an improved motion picture projection system has been proposed. The improved projection system includes a pair of film storage reels and a pair of lengths of motion picture film cowound in reciprocal head-to-tail bifilar relation upon the reels. The films are passed along separate paths between the reels through projection means located intermediate the reels. Separate film advance mechanisms, each having a reversible drive motor, are associated with the films between the reels for driving the film lengths between the reels. The film lengths define respective halves of a motion picture program of specified content; that is, each film may define a separate feature-length motion picture, or the two film lengths may define respective halves of a single feature-length motion picture. During operation of the system, the information carried by that film which moves in a forward mode between the reels is displayed, the information carried by the other film length being displayed when the films move in the opposite direction between the reels.

It is inherent in this projection system that the films are in the same state upon completion of display of the entire program as they were at the time display of the program was commenced. This feature is significant because the system may be operated repeatedly to display the same program without rereeling the film between program presentations; of course, it is necessary to remove the film from the system if the content of the program is to be changed. Such a motion picture projection system is readily usable in the passenger compartments of aircraft operated by international air carriers, as well as in classrooms, small theatres, and in myriad other situations. In any of these usages, however, it is desirable that the projection system be essentially self-regulating so that the person responsible for operation of the system need not do much more than merely turn the system ON to commence program display and turn the system OFF when the program displayed is completed.

The presently preferred use of this projection system is in the passenger compartments of commercial passenger aircraft.

SUMMARY OF THE INVENTION

This invention provides a control system for the improved motion picture projection system described above. The control system provides automatic control over the rate at which film is taken from and supplied to the reels, and also automatically regulates the amount of film which is present in the respective film paths. The control system is arranged to minimize the attention which an operator must give to the projection system during its operation. The control system is arranged so that the equipment required to achieve the desired control functions is minimized, and so that the nature of the film paths between the two reels may be as simple as possible. The simplification of the film paths extends the useful life of the film itself, and increases the number of times the system may be operated to display the same program before the film must be removed from the projection system for cleaning and conditioning. These desirable features of the control system flow from the fact that, due to the cowound bifilar relation of the films on the reels, the basic behavior of one film is reflected in the basic behavior of the other film. That is, in general terms, each film is slaved to the other during movement of the films between the reels, and the necessary control functions provided by the control system are divided between the films so that film tension sensing operations required to generate the desired control signals are distributed substantially equally between the films. The system also has the feature that, upon completion of one mode of operation thereof, the system resets itself to provide appropriate control during subsequent operation of the system in the other mode; that is, the control system has a memory and remembers how it operated during the prior operation of the associated projection system.

Generally speaking, this invention provides a control apparatus for a motion picture projection system which includes a pair of film storage reels. A pair of film lengths are cowound on the reels in reciprocal head-to-tail bifilar relation, and are passed between the reels along separate film paths. Display means are located along the film paths between the reels. The projection system also includes reversible drive means associated with each film length along its path for driving the film between the reels. The control apparatus includes means for sensing a change in the quantity of film present in one of the film paths between one of the reels and the display means. The control apparatus also includes means responsive to the sensing means for controlling operation of the drive means when the sensing means discerns a change in film quantity in excess of a predetermined amount.

Preferably, the rate at which film is unreeled from and reeled upon the respective reels is controlled by information derived from one of the film lengths, and the rate at which the drive means are operated to move film between the reels is controlled from information derived from the other film path.

DESCRIPTION OF THE DRAWINGS

The above-mentioned and other features of this invention are more fully set forth in the following detailed description of a presently preferred embodiment of the control system, which description is presented with reference to the accompanying drawings, wherein:

FIG. 1 is a simplified schematic representation of the control system and its relation to a motion picture projection system of the type described above;

FIG. 2 is an elevation view of an operator's central control panel;

FIG. 3 illustrates the relationship of the schematic diagrams of FIGS. 3A through 3K;

FIGS. 3A through 3K are schematic diagrams of separate portions of the control system, such diagrams being related to each other in the manner illustrated in FIG. 3;

DESCRIPTION OF THE PREFERRED EMBODIMENT

Figure 3A:
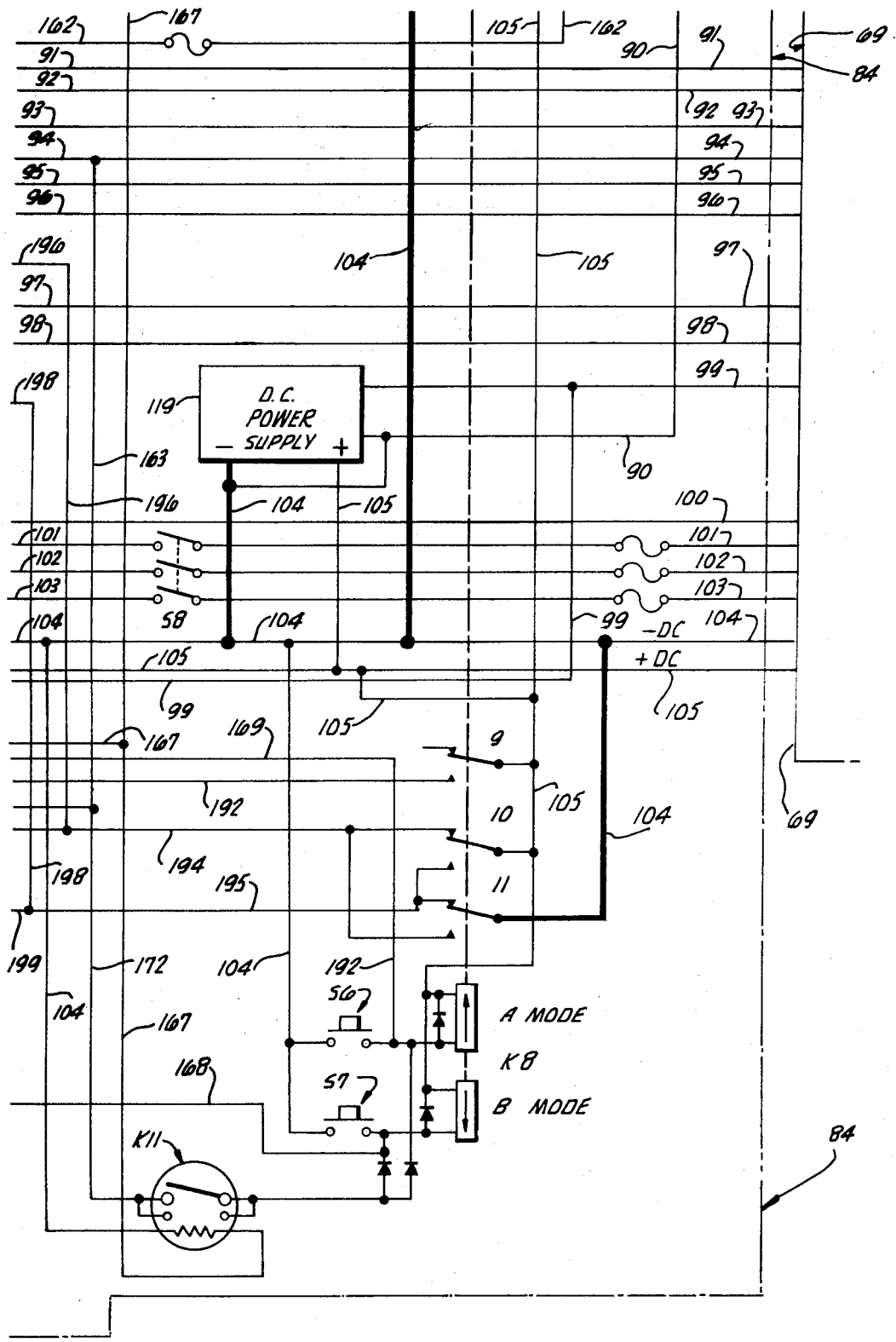

Referring to FIG. 1, the presently preferred use of a control system 10 according to this invention is in combination with a motion picture projection system 12 which includes a pair of projection stations 13 and 14 and a pair of reel stations 15 and 16. In the following description, projection station 13 is sometimes referred to as the No. 1 projection station, projection station 14 is sometimes referred to as the No. 2 projection station, reel station 15 is sometimes referred to as the No. 1 reel station, and reel station 16 is sometimes referred to as the No. 2 reel station.

Reel stations 15 and 16 include, respectively, reels 17 and 18 upon which are cowound, in reciprocal head-to-tail bifilar relation, a pair of film lengths 19 and 20; film length 19 is sometimes referred to hereinafter as the No. 1 film and film length 20 is sometimes referred to as the No. 2 film. Film lengths 19 and 20 define the first and second halves, respectively, of a motion picture program of specified content. A program of specified content may include two feature-length motion pictures, in which case reels 17 and 18 are of sufficient capacity to store both films essentially fully thereon. The term "program of specified content" also encompasses a single feature-length motion picture, in which case film length 19 defines the fist half of the picture and film length 20 defines the second half of the picture. Film lengths 19 and 20 are of essentially equal length and are actually two separate lengths of film.

The reciprocal head-to-tail bifilar relation of film lengths 19 and 20 on reels 17 and 18 may be understood best by assuming that the motion picture program is constituted of a single feature-length motion picture. Assume further that the single film length is folded upon itself at its midlength so that the head end of the portion of the film defining the first half of the program is placed in overlying relation to the tail end of the portion of the film defining the second half of the program, and so that the tail end of the portion of the film defining the first half of the program is placed in overlying relation to the head end of the second half of the program. In this head-to-tail relationship, the film is wound upon reel 17 so that the tail end of the first half of the program and the head end of the second half of the program (i.e., the location where the film is folded on itself) are connected to the core of reel 17, and the head end of the first half of the program and the tail end of the second half of the program are connected to the core of reel 18. Between the reels, the separate halves of the film are threaded along separate film paths through projection stations 13 and 14, respectively. Because the halves of the folded film are wound in overlying relationship on reels 17 and 18, the film is properly said to be cowound in reciprocal head-to-tail bifilar relation upon the reels.

Projection system 12 has two modes in operation. In its A mode, the projection system is operated to move film from reel 17 to reel 18. In its B mode, the projection system is operated to transfer film from reel 18 to reel 17. When the projection system is threaded with film according to the procedure described above and is operated in its A mode, the frames of film length 19 move in a "forward" sequence or mode through projection station 13, and the frames of film length 20 move in a "reverse" sequence or mode through projection station 14. Conversely, when the system is operated in its B mode, film length 19 moves in a "reverse" mode past optical axis 21 of projection station 13, and film length 20 moves in a "forward" mode past optical axis 22 of projection station 14.

Each of projection stations 13 and 14 defines what is substantially a conventional motion picture projection. Thus, projector station 13 includes a lens assembly 25 aligned along optical axis 21 between a pair of film drive sprockets 26; the sprockets constitute a part of an essentially conventional film advance mechanism driven by a reversible motor 27. Located in line with optical axis 21, and on the opposite side of film length 19 from the projection lens assembly, is a projection lamp 28 which is located next to a spare projection lamp 29; the counterparts in projection station 14 of the components of station 13 are identified by corresponding primed numbers, this expedient being utilized for simplification of the illustration of FIG. 1. A fire shutter 30 is disposed in projection station 13 between lamp 28 and the path of film 19, and is operated by a solenoid 31. Projection station 13 also includes a forward-mode shuttle-loop restoring mechanism 32; mechanism 32 is of conventional design and preferably is of the type encountered in commercially available motion picture projectors manufactured by Bell & Howell Company. Projection station 13 also includes a reverse-mode shuttle-loop restoring mechanism 33 which is of different design from mechanism 32 and constitutes a novel feature of the present invention.

Projection station 13 further includes an audio pickup device 34 which cooperates with film length 19 downstream of optical axis 20 during A mode operation of projection system 12. That is, audio pickup device 34 is located between optical axis 21 and reel 18 along the path of film length 19. Projection station 14 includes an audio pickup device 34' which is disposed between optical axis 22 and reel 17 along the path of film length 20. Audio pickup devices 34 and 34' may be of the optical type or of the magnetic type, as desired. In a presently preferred form of projection system 12, projection stations 13 and 14 are identical, and are arranged in erect side-by-side relation with optical axes 21 and 22 thereof directed to a common display screen. The positional reversal of audio pickup devices 34 and 34' relative to their respective film lengths is obtained by the manner in which the film lengths are threaded through the projection system. This threading arrangement is not a part of the present invention and, therefore, is not described herein.

It will be observed from an examination of FIG. 1 that the locations of the forward-mode and the reverse-mode shuttle-loop restoring mechanisms of projector 13 are reversed relative to the corresponding components of projector 14, but occupy the same relative positions along the adjacent film paths when the respective films are moved in a forward mode through the projectors.

Projection lamps 28 and 29 of projection station 13, are mounted in side-by-side relation upon a spring-loaded, slidable shuttle plate (not shown) which normally is positioned so that lamp 28 is aligned with optical axis 21, and similarly with projection lamps 28' and 29' of projection station 14. The shuttle plates are moved by the spring bias applied thereto upon operation of a corresponding spare lamp solenoid K12 and K16 (not shown in FIG. 1, but see FIG. 3) to move to their other limit of travel in which spare lamps 29 and 29', respectively, are aligned with the respective optical axes. Upon arrival of the appropriate shuttle plate at the limit which places the spare lamp in alignment with the respective optical axis, a limit switch S24 or S25 (not shown in FIG. 1, but see FIG. 3) is operated. The details of the spare lamp arrangement, the shuttle plates, and drive mechanisms therefor, are shown in commonly-owned copending application Ser. No. 639,462, filed May 18, 1967.

Fire shutters 30 and 30' are provided to protect film lengths 19 and 20, respectively, from exposure to heat from the projection lamps when the film lengths are stationary relative to the corresponding optical axes, thereby to prevent burning of the film. The fire shutters are also interposed between the projection lamps and the films during the interval following start-up of the projection system in either of its operational modes, within which interval the projection lamps heat up and assume their full operational brightness.

Each of film storage reels 17 and 18 is coupled to a reel drive motor 35 or 36, respectively, via a variably effective coupling mechanism 37, 38, respectively. With reference to reel station 15, coupling mechanism 37 is controlled by the tension in film length 20 adjacent reel 17. Closely adjacent the periphery of reel 17, film length 20 passes around rollers 39, 40 and 41, each of which has a prime numbered counterpart in reel station 16. Rollers 39 and 41 are mounted for rotation about fixed axes, but roller 40 is mounted to a sensing lever 42 having a fulcrum 43. Lever 42 is connected to a biasing spring 44, and is connected by a pivoting linkage assembly 45 to a structure 46 of mechanism 37 which is engaged more directly between reel drive motor 35 and reel 17. Elements 39 through 46 are all components of coupling mechanism 37 and, similarly, at reel station 16, elements 39' and 46' are components of coupling mechanism 38. The coupling mechanisms are essentially identical and are effective to increase or decrease the driving connection of the reel drive motors with the respective reels depending upon (1) the tension of the film engaged with the sensing rollers thereof, and (2) whether the appropriate reel station is functioning to pay out or to reel in film within projection system 12. The connection of the reel drive motors with the corresponding film storage reels preferably is via a belt, and in this regard, mechanisms 37 and 38 are substantially in accord with the disclosures of U.S. Pat. No. 3,398,914 except to the extent illustrated in FIGS. 4 and 5 and described in greater detail hereinafter. Reel drive motors 35 and 36 preferably are reversible synchronous motors which are operated at constant speed. It should be observed at this point that the angular velocity of reels 17 and 18 is controlled by information derived from the state of the No. 2 film, i.e., film length 20.

Reel station 15 includes a normally closed end-of-film switch 48 which is operated by a sensing roller 49 which, during operation of projection system 12, rides against film length 19 to maintain the switch contacts in an open state. Reel station 16 includes a corresponding end-of-film switch 48'. Sensing rollers 49 and 49' are disposed in-line with the position occupied in film length 19 by control apertures 50 (see reel station 16) which are disposed at selected locations along film length 19. Preferably, apertures 50 are disposed adjacent the opposite ends of the film. As will be described below, the sensing of apertures 50 by either of switches 48 or 48' causes the projection system to be shut down, and also produces an adjustment in the state of the logical control mechanisms within control system 10; in this regard, it should be noted that the presently preferred use of projection system 12 is in the passenger compartment of a commercial aircraft in conjunction with a film program constituted of two full length motion pictures.

Projection station 15 includes a looper assembly 52 which is comprised of a plurality of rollers 53 mounted for rotation about stationary axes and a plurality of rollers 54 which are mounted to a common movable carriage 55 biased relative to rollers 53 by a constant force spring mechanism 56 to maintain essentially constant tension in film threaded through the looper in the manner illustrated schematically in FIG. 1. Roller carriage 55 cooperates with a slack sensing switch 57 and a tension sensing switch 58 which are located in spaced relation to each other along the path of movement of the carriage 55. Reel station 16 has associated with it a second looper assembly 60 which includes components 61 through 66 which correspond in structure and function to components 53 through 58, respectively, of looper assembly 52. Looper assembly 52 functions to sense a change in the quantity of film present in the path of film length 19 between reel 17 and projection station 13. Similarly, looper assembly 60 functions to sense a change in the quantity of film present in the path of film 19 between reel 18 and projection station 13. As will be described below, control system 10, to which switches 57, 58, 65 and 66 are connected, operates to provide corrective action within projection system 12 when the extent of change sensed by the looper assemblies exceeds a predetermined amount.

The operational mode (forward or reverse) of motors 27, 27', 35 and 36 of projection system 12 is determined by control system 10. Similarly, the operation of the forward-mode and reverse-mode shuttle-loop restoring mechanisms and of the fire shutter solenoids is regulated by the control system in response to information supplied to the control system by the end-of-film sensing switches and by the film slack and film tension sensing switches of the looper assemblies. The selection of which of the projection lamps and the audio pickup devices is operative at any given time is also determined by the operation of control system 10.

It will be observed from an examination of FIG. 1 that the signals which control the logical operation of the control system are all derived from the state of the No. 1 film, i.e., film length 19. As noted above, the signals which determine the rate at which reels 17 and 18 are driven by their respective drive motors is derived entirely from the No. 2 film. This association of distinct control functions within system 12 with respective ones of the two films present in the projection system is made possible because the films are reciprocally slaved to each other by reason of their cowound bifilar relation upon reels 17 and 18. That is, film length 19 is payed out from reel 17, or reeled onto reel 17, at the same rate as film length 20. Similarly, the presence of an excess quantity of film in the path of film length 19 between reel 17 and projection station 13 will, except in exceptional circumstances, be associated with a corresponding deficiency in the amount of film present in the same film path between projection station 13 and reel 18; similar excesses and deficiencies of film normally will occur in the corresponding portions of the path of film length 20. That is, because the bifilar relation of film lengths 19 and 20 upon reels 17 and 18 necessarily results in the film lengths being payed out from or taken onto the reels at equal rates at either reel station, but not necessarily at both reel stations, the operation of variably effective coupling mechanisms 37 and 38 may be controlled from only one of the film lengths. Similarly, as will be made clear from the following detailed description of the operation of control system 10, information derived from the looper assemblies may be used to advantage to control the movement of film length 20 through projection station 14. A change in the rate at which either film is moved through its projection station will have a corresponding effect in the state of looper mechanisms 52 and 60.

FIG. 1 should not be interrupted to suggest that all information gathering switches which have an effect upon control system 10 are associated with the reel stations or with the projection stations. As noted above, the presently preferred use of projection system 12 is in the passenger compartment of a commercial aircraft; actually, the aircraft includes three projection systems, each of which is in accord with the illustrations of FIG. 1 and the foregoing description. These three projection systems normally are controlled, at least as to film selection, START and STOP commands, and spare lamp injection, from a central control station defined by a stewardess control panel 69, an elevation view of which is provided in FIG. 2.

The face of the stewardess remote control panel is divided into three basic areas 70, 71 and 72, corresponding to the forward, center and aft projection systems installed within the aircraft. Each of panel areas 70, 71 and 72 includes a plurality of illuminated push button switches as follows: SHOW switch 73, CYCLE switch 74, START switch 75, MOVIE No. 1 switch 76, MOVIE No. 2 switch 77, OFF switch 78, and SPARE LAMP switch 79. The control panel 69 also includes an illuminated SEAT MUSIC push button switch 80 which is operable to supply stereophonic music to the headphone connections associated with the various seats in the aircraft, via the motion picture projection systems, in a manner which is conventional and does not form a part of this invention. Panel 69 also includes a key-operated POWER ON/OFF switch 81 which is operable by the stewardess to connect the aircraft 400 cycle three-phase power system to the several control systems 10. A pair of holders 82 are mounted to the face of the control panel to receive legend cards bearing the names of the motion pictures defined by film lengths 19 and 20, respectively. Each of switches 73–78 is connected in parallel with a corresponding switch or relay located within a control box 84 located within the housing of the projection system to which the several switches are pertinent. Switch 81 is connected in series with a corresponding power switch S8 in each control system 10 within the aircraft.

Figure 3C:
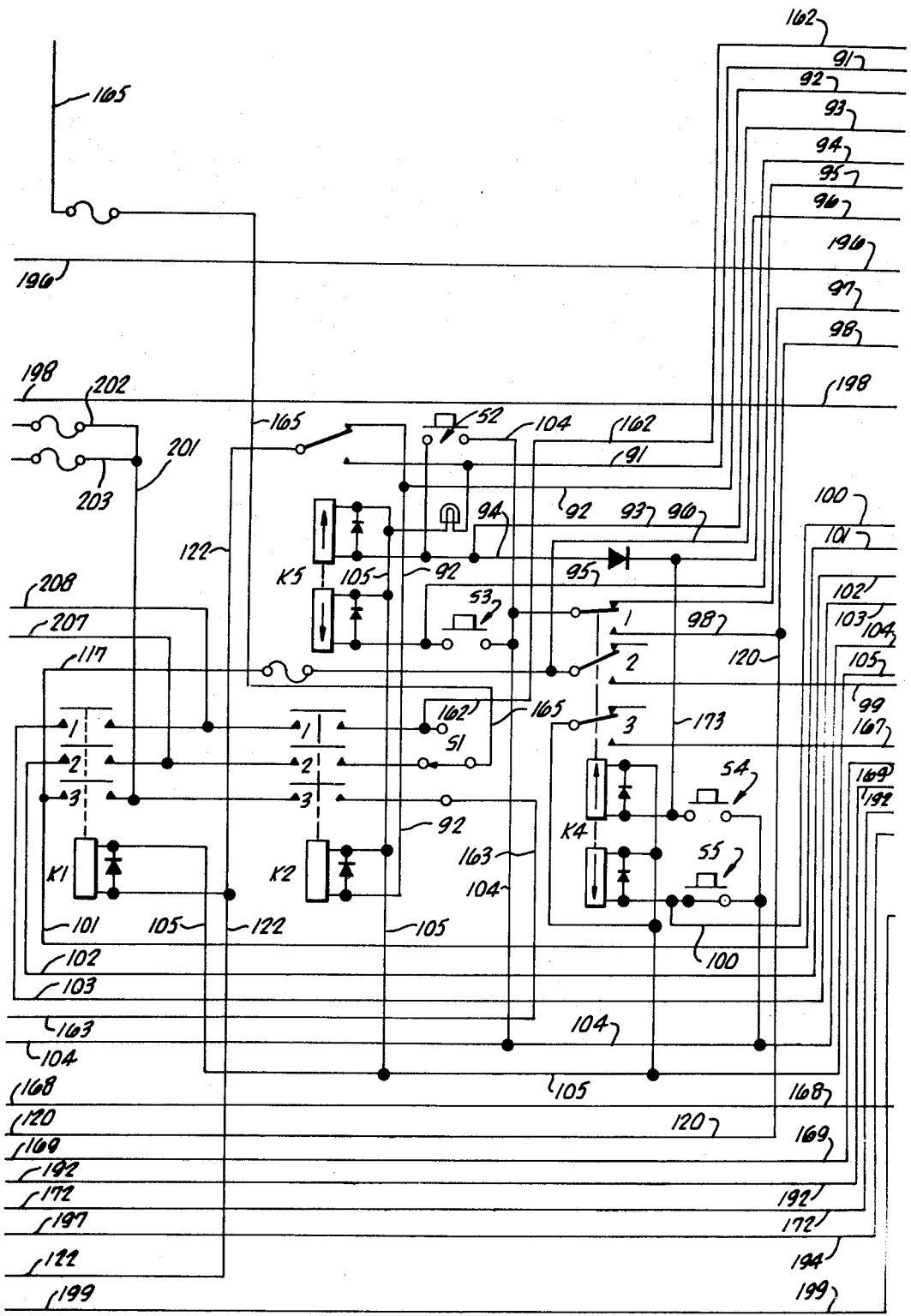
Figure 3E:
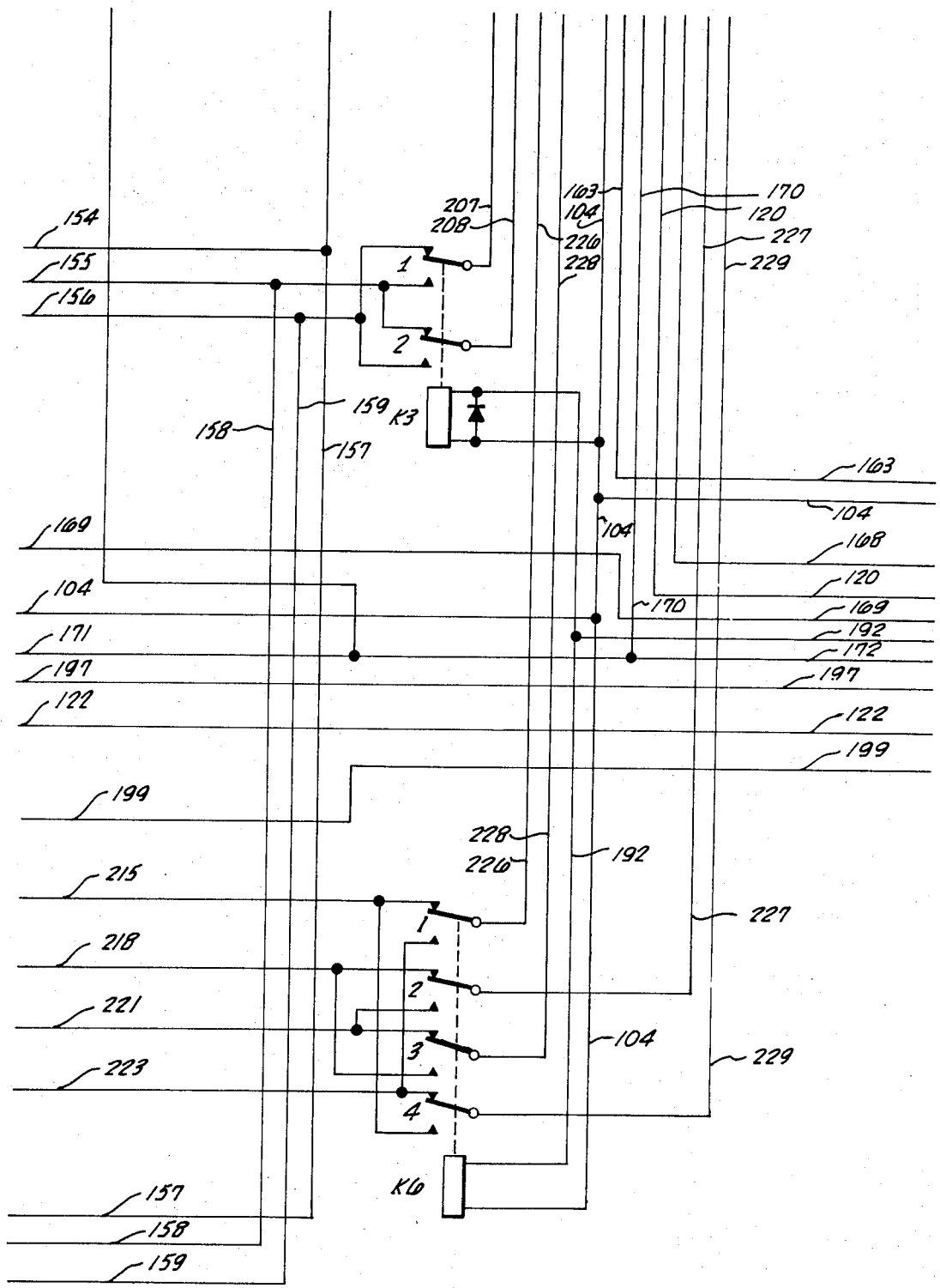
Figure 36:
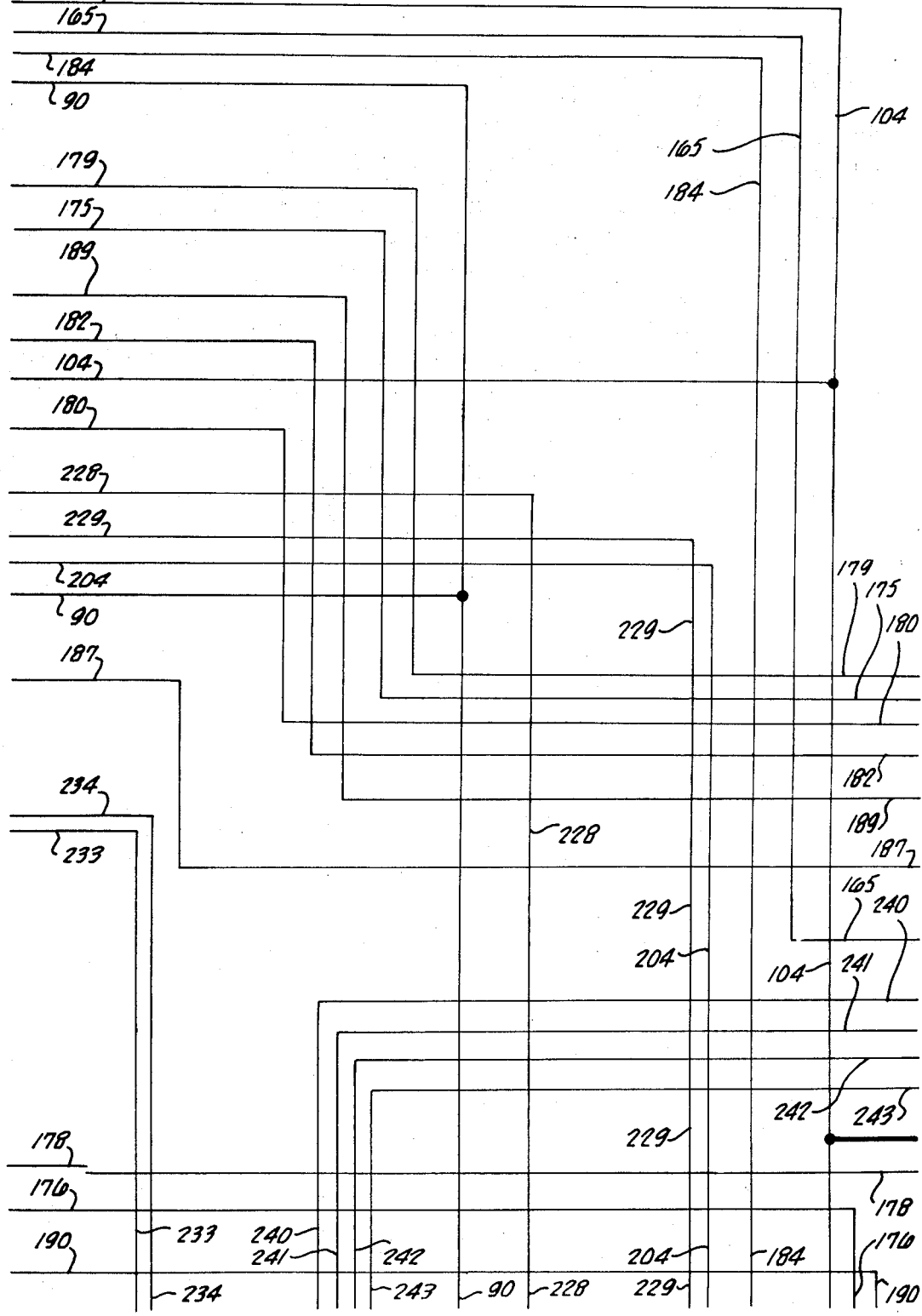
Figure 3K:
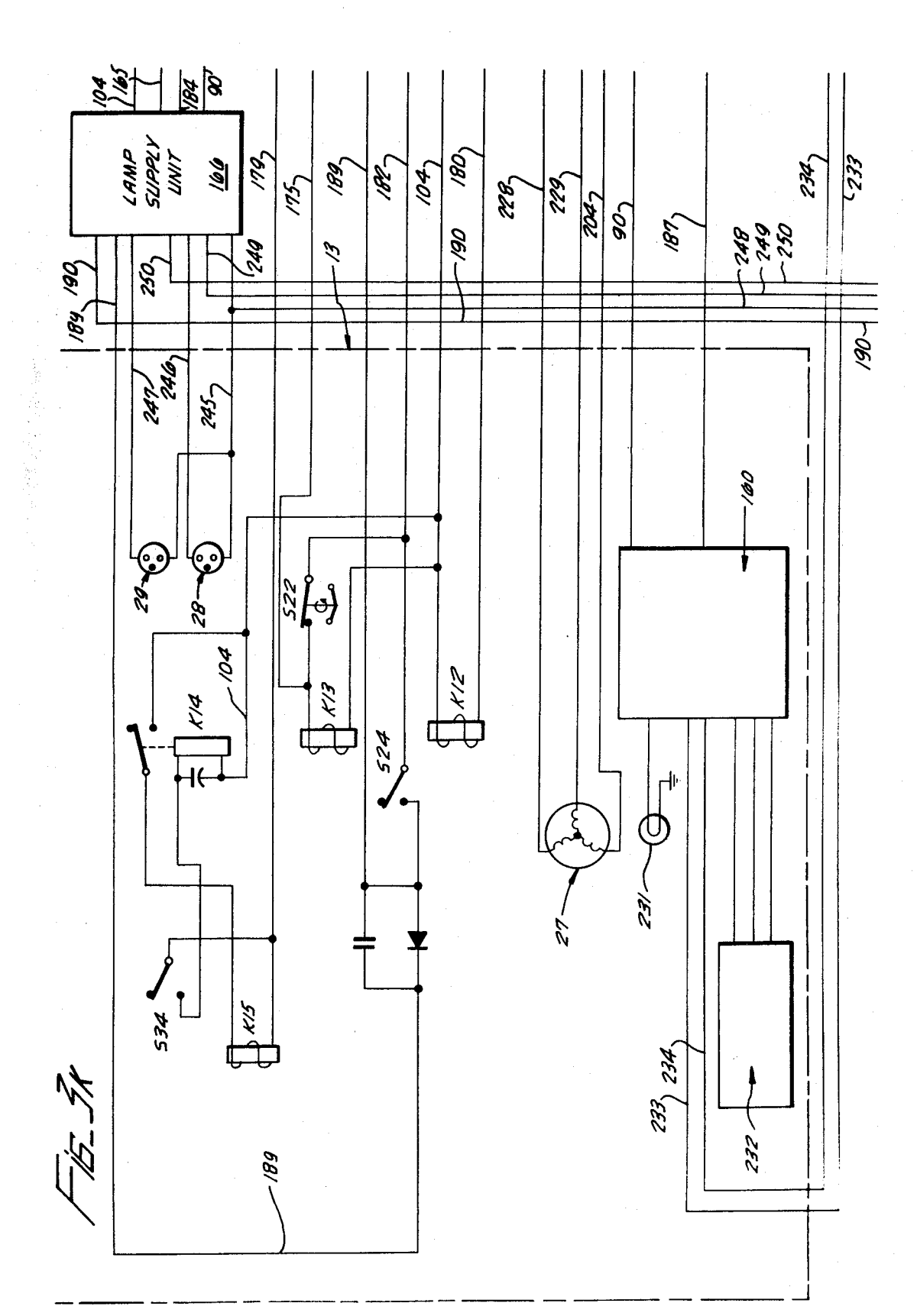

Referring now to FIG. 3, and the several portions 3A–3K thereof which collectively set forth a schematic wiring diagram of control system 10, a plurality of leads 85–105 connect remote control panel 69 with the several identical control boxes 84 within the aircraft. These leads are designated as follows:

LEAD    DESIGNATION

| | |
|---|---|
| 85 | "Pilot keying ground" which, when energized, connects a pilot intercom into the audio circuitry of the projection system; |
| 86 | "Movie No. 1 indicator" which, when energized, causes illumination of push button 76 for the projection system; |
| 87 | "Movie No. 2 indicator" which, when energized, produces illumination of push button 77 for the projection system; |
| 88 | "Spare lamp switch" which, when energized, produces operation of the spare lamp shuttle mechanism associated with that projection station operating in a forward mode in the projection system; lead 88 is energized by operation of switch 79 at remote control panel 69; |
| 89 | "Spare lamp indicator" which is energized by operation of the limit switch associated with the projection lamp shuttle plate associated with lead 88; |
| 90 | "AC ground"; |

| | |
|---|---|
| 91 | "Cycle indicator" which, when energized, produces illumination of push button 74 at the remote control panel; |
| 92 | "Show indicator" which, when energized, produces illumination of push button 73 at the remote control panel; |
| 93 | "Show switch" which is energized by operation of switch 73; |
| 94 | "Off switch" which is energized by switch 78 at the remote control panel; |
| 95 | "Cycle switch" which is energized by operation of switch 74; |
| 96 | "115 VAC in" from control box 84 to remote control panel 69; |
| 97 | "Off indicator" which, when energized, produces illumination of push button 78 at the central remote control panel; |
| 98 | "Start indicator" which, when energized, produces illumination of push button 75; |
| 99 | "115 VAC return" from central control panel 69 to control box 84; |
| 100 | "Start switch" which normally is energized by switch 75; |
| 101 | "C-phase" 400 Hz. power; |
| 102 | "B-phase" 400 Hz. power; |
| 103 | "A-phase" 400 Hz. power; |
| 104 | "Minus DC bus"; |
| 105 | "Plus DC bus". |

Each of leads 86–89, 91–95, and 97–100 is connected to minus DC bus 104 via the corresponding indicator lamp or push button switch located in remote control panel 69.

Control box 84 includes a plurality of relays which are designated K1, K2 . . . . Where these relays have multiple contacts, the contacts are designated 1, 2, 3, etc., proceeding downwardly through the vertically aligned contacts. That is, with reference to mode selector relay K8, the contacts thereof are designated K8–1, K8–2 . . . K8–11. This convention is adhered to for simplicity of description in the following text.

Similarly, control system 10 includes several switches which are designated S1, S2 . . . . Where these switches have multiple contacts of significance, the contacts are designated 1, 2, 3, etc., proceeding vertically downwardly through the contact array in the accompanying drawings. Thus, with reference to phase selector switch S1, the contacts thereof are designated S1–1, S1–2, S1–3. This convention also is adhered to for the purposes of simplicity of description in the following text.

Three-phase 400 Hz. power from the aircraft is supplied to the control system from central remote control panel 16 via leads 101, 102 and 103 to the contacts of main contactor relay K1. Three-phase power ON/OFF switch S8 is connected in series with contactor K1 from control panel 69 and is provided so that a technician, following operation of switch 81 at panel 69, may energize or deenergize the control system without having to walk back and forth between control box 84 and panel 69. During normal operation of the control system, switch S8 is closed so that energization of the control system is regulated by operation of switch 81 at control panel 69. Preferably, switch S8 is key operated like switch 81. The other switches of control panel 69 are all duplicated in control box 84, except for spare lamp switch 79, so that a servicing technician may service or test the control system at the location of the system itself without repeatedly moving back and forth to remote control panel 69.

Lead 117 is connected in parallel with contacts K1–3 to 115 volt AC in lead 96 so that, upon closure of both of switches 81 and S8, C-phase main power is supplied to the energization terminals of a 28 volt DC power supply 119. The DC power supply has its minus output terminal connected to minus DC bus 104 and to the ground energization terminal of the power supply. The positive output terminal of the power supply is connected to plus DC bus 105.

Energization of contactor K1 is controlled by operation of START switch S5 (connected in parallel with remote START switch 75) intimately associated with the down winding of START/STOP latching relay K4. Operation of relay K4 into its START mode completes a circuit via contact K4–1 and lead 120 from the minus DC bus to series-connected reel station lockout switches S9 and S10 (located in reel stations 15 and 16, respectively, and interconnected by lead 121), switch S10 being connected to the coil of main contactor K1 via lead 122. Lockout switches S9 and S10 are associated with the DC gear motors provided in the reel stations for shifting a pivot point in each of linkages 45 and 45', thereby to reverse the control functions provided by mechanisms 37, 38 relative to reels 17 and 18, respectively.

Figure 5:
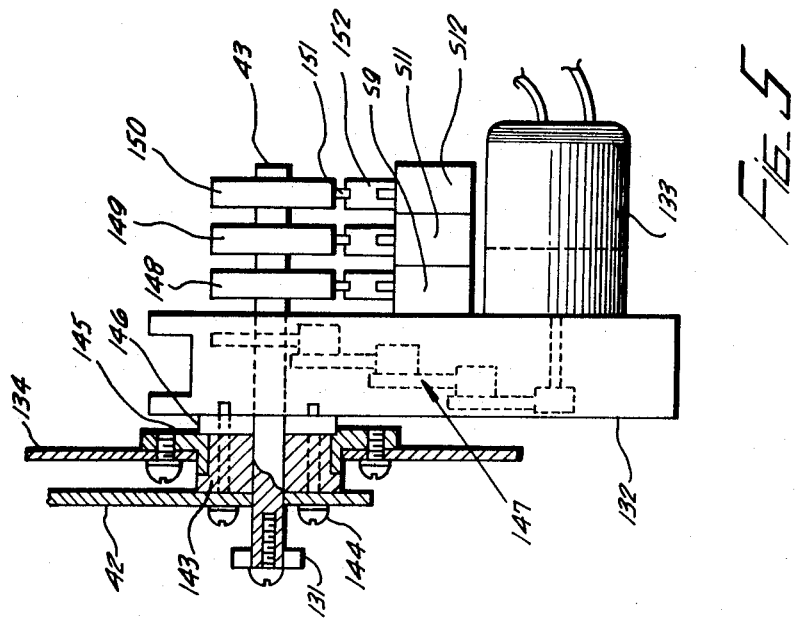
FIG. 5 is a cross-sectional elevation view of a portion of the structure shown in FIG. 4.
Figure 4:
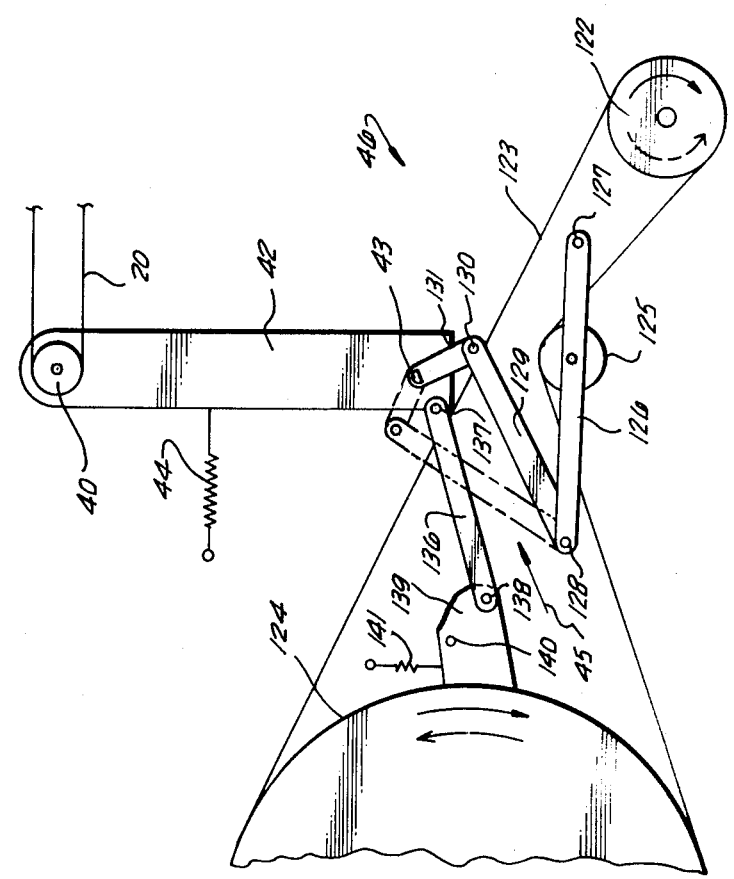
FIG. 4 is a fragmentary elevation view of a portion of the mechanism provided adjacent each film storage reel for regulating the rotational rate of the reel.

FIG. 4 is an elevation view of the mechanism which is variably effective to couple reel drive motor 35 to reel 17 in reel station 15. The output shaft of reel drive motor 35 is connected to a belt drive pulley 122 which drives a belt 123 engaged with the periphery of a reel drive pulley 124 to which film storage reel 17 is coaxially mounted. Between pulleys 122 and 124, the belt is engaged with a tensioning pulley 125 mounted to a support arm 126 having a fixed pivot 127 at one end thereof. The other end of arm 126 is connected by pivot 128 to one end of a connecting link 129. The opposite end of link 129 is pivoted at 130 to a shift link 131 which is keyed to the output shaft 43 of a gear box 132 (see FIG. 5). As shown in FIG. 5, the input to the gear box is provided by a reversible DC motor 133. The gear box is disposed on the opposite side of a reel station chassis plate 134 from the structure shown in FIG. 4. Shaft 43 serves as the pivot point or fulcrum of sensing lever 42 (in this regard, see FIG. 1 and the description presented relative thereto).

A second connecting link 136 has one end thereof pivoted at 137 to the sensing lever adjacent fulcrum shaft 43. The other end of link 136 is pivoted at 138 to a brake shoe 139 which in turn is pivoted at 140 to chassis plate 134 for movement into frictional engagement with the periphery of reel drive pulley 124 in response to the bias of a spring 141.

When the elements illustrated in FIG. 4 are arranged in the position shown in solid lines, reel station 15 functions as a take-up device for film lengths 19 and 20. In such a situation, gear box output shaft 43 is so disposed angularly relative to sensing lever 42 that the pivotal connection at 130 between shift link 131 and connecting link 129 lies away from reel drive pulley 124 relative to a line through shaft 43 and tension sensing roller 40. As tension in film 20 increases to move sensing lever 42 clockwise about shaft 43, support arm 126 is moved in such manner that the tension in belt 123 is decreased, thereby to decrease the effectiveness of the coupling between belt drive pulley 122 and reel drive pulley 124 via belt 123 and reduce the rate at which film is taken onto the reel. Conversely, when film length 20 becomes slack at sensing roller 40, spring 44 induces the sensing lever to move counterclockwise about shaft 43, thereby to increase the tension with which belt 123 is engaged between pulleys 122 and 124 and increase the rate at which the reel is driven by motor 35. During such operation of the structure shown in FIG. 4, brake shoe 139 idles relative to belt drive pulley 124. Clockwise rotation of the sensing lever about its fulcrum shaft causes the brake shoe to be moved into more intimate engagement with the periphery of the reel drive pulley, but the direction of rotation of this pulley is such as to tend to move the brake shoe out of engagement with the pulley.

When projection system 12 is operated in its A mode, such that it is necessary for film storage reel 17 to function as a film supply reel, mechanism 46 is adjusted so that the manner in which movement of sensing lever 42 is effective upon drive belt 123 is reversed from that relationship described above. To accomplish this adjustment, motor 133 is operated to rotate shaft 43 clockwise relative to sensing lever 42 to such extent that shift lever 131 assumes the position shown in dotted lines in FIG. 4. In this alternate position, the pivot of connecting link 129 to shift link 131 lies toward reel drive pulley 124 from a line through fulcrum shaft 43 and sensing roller 40. When reel station 15 functions to supply film to projection system 12, reel drive motor 35 is reversed to reverse the direction of rotation of belt drive pulley 122, as shown by the dashed arrows in FIG. 4. During operation of reel station 15 in a supply mode, clockwise movement of the sensing lever about fulcrum shaft 43, in response to an increase in tension in film 20, is effective to produce an increase in the tension of belt 123 on reel drive pulley 124, thereby to cause reel 17 to rotate faster and supply more film to projection station 14. Conversely, the presence of slack in film 20 at sensing roller 40 results in counterclockwise movement of the sensing lever about its fulcrum axis, thereby producing a reduction in drive belt tension and inducing the brake shoe to engage the periphery of the reel drive pulley more intimately. In this case, however, the direction of rotation of reel drive pulley 124 is such that increased engagement of the brake shoe with the pulley is effective to retard rotation of the supply reel 17, thereby reducing the rate at which film is payed out from the reel and increasing the tension in film 20. This is true because motor 27' associated with projection station 14 continues to operate at a constant rate, the rate of operation of motor 27' being altered only in response to control signals derived from the state of film 19 at loopers 52 and 60.

As shown in FIG. 5, sensing lever 42 is secured to a bearing ring 143 by screws 144. Bearing ring 143 rotatably journals shaft 43 and is itself rotatably mounted in a bushing 145 which is immovably mounted to chassis plate 134. Screws 144 pass through a standoff ring 146 and into gear box 132 which contains a motion reducing gear train 147 connected between shaft 43 and the shaft of DC motor 133. It is apparent, therefore, that gear box 132 and sensing lever 42 are fixed relative to each other angularly of the axis of shaft 43, and that the gear box moves relative to chassis plate 134 with and during movement of the sensing lever. It follows, therefore, that operation of motor 133 produces rotation of shaft 43 relative to the sensing lever, thereby to adjust the position of shift link 131 angularly of the sensing lever about the axis of shaft 43.

Shaft 43 extends exteriorly of the gear box away from chassis plate 134 to mount three cams 148, 149 and 150. Three microswitches S9, S11 and S12 are mounted to the adjacent face of the gear box for cooperation with cams 148, 149 and 150, respectively, via cam follower rollers 151 supported on the free ends of cantilever springs 152 which, when deflected, operate the normally open switches. Switch S9 is the lockout switch associated with reel station No. 1 as shown in FIG. 3I. Switch S11 is the forward mode limit switch for motor 133 and switch S12 is the reverse mode limit switch for the motor. Cam 148 is contoured so that switch S9 is closed when shift link 131 is in either of the positions illustrated in the solid and dashed lines in FIG. 4, but is open when the shift link is intermediate these two limiting positions. Cam 149 is contoured so that switch S11 is open only when shift link 131 is in the position shown in solid lines in FIG. 4 relative to sensing lever 42. Cam 150 is contoured so that switch S12 is open only when shift link 131 is in the position shown in dotted lines in FIG. 4 relative to sensing lever 42.

In reel station 16, the counterparts of switches S9, S11 and S12 are designated S10, S13 and S14, respectively; see FIG. 3G.

In view of the foregoing descriptions presented with respect to FIGS. 4 and 5, it is seen that the drive rate control mechanisms associated with reels 17 and 18 are essentially in accord with U.S. Patent No. 3,398,914. The reel stations described in this patent, however, are capable of functioning only as either a supply station or a take-up station, but not in alternate modes as is possible with the reel stations of this invention. The ability to shift the point of pivotal connection between sensing lever 42 and connecting link 129 enables the present reel stations to function alternately as film supply and film take-up mechanisms without reliance upon complicated control devices; the control mechanisms shown in FIGS. 4 and 5 are simple, economic, efficient and, probably most importantly, reliable and compact.

Returning now to the schematic diagram of FIG. 3, it will be seen that, in view of the foregoing description concerning FIGS. 4 and 5, main contactor K1 cannot be operated upon closure of START switch S5 unless motors 133 at the reel stations are in one limit or the other such that both lockout switches S9 and S10 are closed. This relationship of the lockout switches to contactor K1 prevents film from being moved through projection system 12 until the shift links of the reel station drive belt tension regulating mechanisms are in their appropriate positions, thereby to render the reel station sensing levers effective to properly monitor film tension adjacent to reels 17 and 18.

Operation of main contactor K1 results in three-phase power being supplied to reel station 1 via leads 154, 155 and 156, which are associated with C, A and B phase power, respectively, during A mode operation of the control system. Similarly, the connection of leads 155 and 156 to the corresponding contacts of relay K1 is via contacts K3–1 and K3–2 of a phase reversing relay K3 which is operated only during a B mode condition for the projection system. Three-phase power is supplied to reel drive motor 36 via leads 157, 158 and 159 coupled in parallel with leads 154–156 between relay K3 and reel station 16.

It is assumed that subsequent to operation of relay K1 and switch S8 to supply three-phase power to control system 10, but prior to closure of START switch S5, SHOW switch 73 at remote control panel 69 has been operated. Operation of switch 73 corresponds to operation of switch S2 since these switches are coupled in parallel via lead 93. Closure of either of switches S2 or 73 completes a circuit between the plus and minus DC busses via the up winding of relay K5 which is a SHOW/CYCLE selector relay. In the down or CYCLE state of relay K5, a latching relay, push button switch 74 is illuminated by DC power supplied thereto via conductor 91; the system then is in essentially the same state as if switch S2 were operated, except that no AC power is supplied to audio preamplifiers 160 and 161 in projection stations 13 and 14, respectively, or to projection lamp power supply 166 inasmuch as CYCLE contactor K2 is not then operated and no single-phase AC power is available over leads 162 and 165 which are energized only upon operation of both relays K1 and K2. Thus, CYCLE switch S3 is operated when it is desired to test projection system 12 for its ability to properly control and move motion picture film, or when it is desired to shuttle film through the projection system without display of the film.

As noted above, operation of SHOW switch S2 energizes relay K2 to supply single-phase AC power to lead 162 to operate whichever one of preamplifiers 160 and 161 is associated with a forward moving film. Operation of relays K1 and K2 also supplies single-phase AC power from phase selector switch contact S1–3 via lead 163 to an energization terminal of an audio power amplifier 164, a second energization terminal of which is connected to AC ground lead 90. Phase selector switch S1 is provided for selecting which of the three phases of aircraft power will be applied via lead 165 to operate lamp power supply 166.

Assume that projection system 10 is to be operated in its A mode, that main contactor K1 and CYCLE contactor K2 have been operated in response to operation of show switch S2, and that mode control relay K8 is in its up or A mode position as a result of the state in which the control system was left following completion of the last preceding operation of the projection system. Accordingly, closure of start switch S5, energizes the down coil of START/STOP latching relay K4 and completes a DC circuit through K4–3 to the heaters of time delay relays K7 and K11. Relay K7 is a fire shutter time delay relay and relay K11 is an end-of-film override time delay relay.

The contacts of relay K11 are normally open, and close approximately 5 seconds following energization of the relay. This time delay function is required since the control system was operated from a B mode state to an A mode state at the end of the last operation (B mode) of the projection system. As noted above, the system is turned OFF by cooperation of film aperture 50 with end-of-film switches 48 and 48'. At the time switches 48 and 48' are operated, the projection system is operating at normal speed and the rotating elements of the system have momentum which must be dissipated before the film comes to a complete stop, at which time apertures 50 have passed beyond switches 48 and 48'. Therefore, upon commencement of operation of the projection system in its A mode, apertures 50 will move back past the sensing rollers of the end-of-film switches and cause the control system to operate main contactor K1 and turn the system OFF. Time delay relay K11, however, disables end-of-film switches 48 and 48' for 5 seconds following operation of START switch S5, during which period film apertures 50 will have moved clear of the sensing rollers for the end-of-film switches. As shown in FIG. 3I, end-of-film switch 48 for reel station 15 actually corresponds to two switches S15 and S16, and switch 48' of reel station 16 (FIG. 3H) corresponds to two switches S17 and S18. Switches S15 and S16 are closed when sensing roller 49 detects an aperture in film length 19, and switches S17 and S18 are closed when roller 49' detects an aperture in the same film length.

Switch S15 is connected by lead 168 in parallel with B mode switch S7 to the down coil of mode selector relay K8 to shift the logic of control system 10 from A mode logic to B mode logic upon closure of either of such switches. End-of-film switch S17 in the No. 2 reel station is connected by lead 169 in parallel with A mode switch S6 to the up coil of relay K8. Switches S15 and S7 are connected in parallel between the plus and minus DC busses and, similarly, switches S17 and S6 are connected in parallel between the plus and minus DC busses.

Switches S16 and S18 are connected in parallel with each other from minus DC bus 104 by leads 170 and 171, respectively, which are each connected to a lead 172 which completes a circuit via the contacts of time delay relay K11 to the up and down coils of relay K8 to energize whichever of the coils does not correspond to the state of the relay. A thermostatic switch S19 is disposed in a common housing or shroud for projection system 12 and is connected in parallel with switch S18. A lead 173 is connected between lead 172 to the up coil of relay K4 in parallel with STOP switch S4 so that closure of any of switches S16, S18 and S19 in addition to reversing the state of relay K8, also stops the projection system. Thus, upon next starting the projection system, control system 10 remembers its last order (shift in operational mode) and performs accordingly.

Looper 52 includes a STOP switch S20 (operated by either the complete absence of film in looper 52 or an extremely slack film state in the looper) connected in parallel with switch S16 for both stopping the projection system and reversing the logical mode of the control system as defined by the state of relay K8. Similarly, looper 60 includes a stop switch S21 connected in parallel with switch S18 for producing the same functions as switch S20 upon operation thereof.

It was stated above that the heater of fire shutter time delay relay K7 is energized upon closure of contact K4–3. Relay K7 is normally closed, and opens approximately 30 seconds after energization of its heater. The contacts of relay K7 are in series connection to the heater of such relay. So long as the contacts of relay K7 are closed, fire shutter solenoids K13 and K17 in projection stations 13 and 14, respectively (corresponding to solenoids 31 and 31' shown in FIG. 1), are held energized to maintain fire shutters 30 and 30', respectively, in place to mask film in the appropriate projection station from direct exposure to the adjacent projection lamps. The projection lamps heat to full brightness within thirty seconds; relay K7 exposes the energized lamp to the adjacent film after the lamp attains full brightness. As shown in FIG. 3, the plus side of solenoid K13 is connected in series to the contacts of relay K7 via contacts K8–3 during A mode operation of the projection system, such connection being in parallel with a centrifugally operated switch S22 which is so coupled to the film advance mechanism for film 19 that switch S22 is closed whenever film is stationary across optical axis 21. Similarly, fire shutter solenoid K17 in projection station 14 is connected in series with the contacts of time delay relay K7 via contacts K8–3 during B mode operation of the projection system. The connection of the plus side of the solenoid K17 to relay K7 is in parallel with a centrifugally operated switch S23 which is identical to and performs a similar function to switch S22 described above.

The functions of the several contacts of mode selector and control relay K8 are as follows:

a. Contacts K8–1 are idle and are provided as spares for any additional control function which is to be performed in response to a shift in the operational mode of the projection system.

b. Contacts K8–2 select for connection to plus DC bus 105 one or the other of leads 178 and 179 which are connected to the shuttle loop sensing and restoring mechanisms of projection stations 13 and 14, respectively, such sensing and restoring mechanisms being described below.

c. Contacts K8–3 select one or the other of leads 175 and 176 for connection to relay K7 for the purposes described above.

d. Contacts K8–4 select which of leads 180 and 181 will be connected to spare lamp lead 88 from remote control panel 69; leads 180 and 181 are connected to lamp change solenoids K12 and K16, respectively, of projection stations 13 and 14, respectively, the function of which solenoids was described relative to the explanation of FIG. 1.

e. Contacts K8–5 select between leads 182 and 183 for connection to the plug DC bus, such leads being connected in series with lamp change switches S24 and S25, respectively; switches S24 and S25 are operated upon movement of the slidable projection lamp support plates into such positions that lamps 29 or 29', respectively, are aligned with their optical axes. Closure of switches S24 and S25, when appropriately selected by contacts K8–5, energize push button switch 79 via contacts K8–8.

f. Contacts K8–6 are open during A mode operation of the projection system, and in the B mode connect lead 184 to the DC bus; lead 184 is an element of the energization circuit of an audio output phase reversing relay K9, as well as a component of the energization circuit of a high voltage relay (not shown) located in lamp power supply unit 166 for switching the high voltage output of the lamp supply to the proper projection lamp of the projection station then operating in a forward mode.

g. Contacts K8–7 select between conductors 187 and 188 for connection to 115 volt AC line 162 so that an appropriate one of the audio amplifiers in projection stations 13 and 14 may be energized, depending upon which film length is then moving in a forward mode through its projection station.

h. Contacts K8–8 select between leads 189 and 190 which are connected in parallel across switches S24 and S25, respectively, for illumination of push button 79 in remote control panel 69 upon use of the spare projection lamp in the projector associated with forward moving film.

i. Contacts K8–9, during B mode operation of the projection system, provide a connection between plus DC bus 105 and a lead 192 which completes the energization circuits of phase reversing relays K3 and K6; operation of relay K3 causes a reversal in the direction of operation of reel drive motors 35 and 36, and operation of relay K6 reverses the control functions provided by the looper tension and slack sensing switches.

j. Contacts K8–10 and K8–11 operate conjunctively to reverse the connection of leads 194 and 195 to the plus and minus DC busses. Lead 194 is connected via lead 196 and to series connected limit switches S11 and S12 associated with gear motor 133 of reel station 15, and via lead 197 to the series connected limit switches S13 and S14 of the gear motor for reel station 16. Leads 198 and 199 connect lead 195 to the other energization terminals of the gear motors for reel stations 15 and 16, respectively.

It is apparent from the foregoing resume of the functions provided by the several contacts of mode selecting and controlling relay K8 that the operational modes and logical functions assigned to the major drive and sensing elements of systems 10 and 12 are reversed upon a shift of this relay from one of its states to the other. It is also clear that relay K8 is operated from one of its two stable states to the other upon operation of STOP switch S4 or OFF switch 74, as well as upon the occurrence of any other event within the combined control and projection systems which corresponds to breakage of either of the films, to unsafe conditions such as an excess heat level, or to any condition which, if continued, would lead to breakage of film.

Relay K10 is a pilot intercom override relay which is connected between positive DC bus 105 and negative DC bus 104 via pilot keying ground line 85 and a grounding switch (not shown) located in the pilot compartment of the aircraft. The grounding switch is operable by the pilot to interrupt the connection between the output of audio power amplifier 164 and the various headphone sets throughout the aircraft so that pilot messages may be transmitted to the passengers.

It was mentioned above, with reference to the description of FIG. 1, that reel drive motors 35 and 36 and drive motors 27 and 27' for the film advance mechanisms in projection stations 13 and 14 are all three-phase reversible synchronous motors. A lead 201 is connected to the C-phase power line between contactors K1 and K2 and has one branch 202 which extends directly to connection with leads 154 and 157 from the C windings of reel drive motors 35 and 36, respectively. Lead 201 has a second branch 203 which is, in turn, branched by leads 204 and 205 to the C windings of projection station drive motors 27 and 27', respectively. Thus, the connection of the C phases of motors 27, 27', 35 and 36, relative to contact K1–3 is constant. The energization of reel drive motor 35 is completed by a lead 207 (B phase) extending from between contacts K1–2 and K2–2 to contacts K3–1. A third lead 208 (A phase) is connected from between contacts K1–1 and K2–1 to contacts K3–2. Contacts K3–1 and K3–2 are wired in a phase reversing relation relative to parallel connected leads 155 and 158, on the one hand, and to parallel connected leads 156 and 159, on the other, so that upon operation of relay K3 the connection of leads 155 and 156 to leads 207 and 208 is reversed, and similarly with leads 158 and 159. Accordingly, operation of relay K3 (controlled by contacts K8–9) reverses the direction in which reel drive motors 35 and 36 are operated.

The supply of A and B phase AC power to projection station motors 27 and 27' is provided via the slack and tension sensing switches in loopers 52 and 60 and via the contacts of phase reversing relay K6. The slack sensing function of looper 52 is provided by two normally closed slack switches S26 and S27 which are operated essentially in unison by support 55 for looper rollers 54 when an excess quantity of film is sensed in the path of film length 19 between reel 17 and projection station 13. The tension sensing function of looper 52 is provided by normally closed tension switches S28 and S29 also operated essentially in unison by roller support 55. Switches S26–S29 have counterparts S30–S33 in looper 60 associated with reel station 16. Switch S26 of looper 52 and tension switch S32 of looper 60 are connected in series by lead 210. Slack switch 27 of looper 52 and tension switch S33 of looper 60 are connected in series by lead 211. Tension switch S28 of the No. 1 looper and slack switch S30 of the No. 2 looper are connected in series by lead 212, and similarly, No. 1 looper tension switch S29 and No. 2 looper slack switch S31 are connected in series by lead 213. Switches S26 and S32 are connected by leads 214 and 215 between A phase lead 208 and the normally closed one of contacts K6–1 which is also connected to the normally open one of contacts K6–4. Series connected switches S27 and S33 are connected by leads 217 and 218 between B phase lead 207 and the normally closed one of contacts K6–2, which contact also is connected to the normally open one of contacts K6–3. Series connected switches S28 and S30 are connected by leads 220 and 221 between A phase lead 208 and the normally closed one of contacts K6–3, which contact is also connected to the normally open one of contacts K6–2. Finally, series connected switches S29 and S31 are connected by leads 222 and 223 between B phase lead 207 and the normally closed one of contacts K6–4 which is also connected to the normally open one of contacts K6–1.

The movable one of contacts K6–1 is connected by a lead 226 to that winding of film advance motor 27' which has B phase energization during A mode operation of the projection system. The movable one of contacts K6–2 is connected by lead 227 to that winding of motor 27' which is to have A phase energization during A mode operation of the projection system. The movable one of contacts K6–3 is connected by lead 228 to the winding of film advance motor 27 which is to have A phase energization during A mode operation and, finally, the movable one of contacts K6–4 is connected by lead 229 to that winding of motor 27 which is to have B phase energization during A mode operation. The interconnection of switches S26–S33 to motors 27 and 27' via relays K3 and K6 enables a reversal of the direction in which the motors are operated and a reversal of the logical relationship of the switches to the motors when the projection system is switched from A mode operation to B mode operation.

Closure of either or both of switches S26 and S32 results in the interruption of B phase energization of film advance motor 27' during A mode operation of the projection system, and in interruption of B phase energization of film advance motor 27 for film 19 during B mode operation of the system. Operation of either or both of switches S27 and S33 has similar effect upon the A phase energization of these same motors during alternate modes of projection system operation. The interruption of either the A or B phase energization of either of motors 27 or 27' results in a stoppage of the motors. As noted above, switches S26 and S27 operate essentially in tandem, as do switches S32 and S33. Similarly, the operation of either or both of switches S28 and S30 during A mode operation of the projection system results in an interruption of A phase energization of motor 27 and, during B mode operation, in interruption of A phase energization of motor 27'. Operation of either or both of switches S29 and S31 results, during A mode operation of the projection system, in interruption of B phase energization of motor 27 and, during B mode operation, in interruption of B phase energization of motor 27'.

It is apparent, therefore, that the switches of loopers 52 and 60 are interconnected so that the sensing of tension between film storage reel 17 and projection station 13 is productive of the same control over the operation of motors 27 and 27' as is produced by a sensing of slack in the path of film 19 between film storage reel 18 and projection station 13, and that the specific control effects produced by sensing of such phenomena is the reverse during A mode operation from the control effects produced during B mode operation; the converse is true for the sensing of slack at looper 52 and the sensing of tension at looper 60. The sensing of tension in either looper indicates that less than a desired quantity of film is present in the adjacent leg of film path 19. In like manner, the sensing of slack in either looper means that an excess quantity of film is present in the adjacent leg of the path of film 19.

Assume that looper 52 senses an excess quantity of film between reel station 15 and projection station 13 during A mode operation of the projection system when film is being transferred from reel 17 to reel 18. Such a situation means that the film advance mechanism of projection station 13 is, in effect, lagging behind the film advance mechanism of projection station 14 in terms of the transport of film between the reels. The desired quantity of film is reestablished along the path of film 19 between reel 17 and projection station 13 by shutting down operation of motor 27' until the proper quantity of film is reestablished in the No. 1 film path through continued operation of reel station 15. Conversely, sensing of a deficient quantity of film in the portion of the No. 1 film path monitored by looper 52 during A mode operation of the projection system results in the interruption of operation of motor 27 until reel 17 has payed out sufficient film to reestablish the desired amount of film in the appropriate leg of the No. 1 film path. An interruption in the transport of film 19 from reel 17 to reel 18 by stoppage of motor 27 does not produce problems since reel drive motors 35 and 36 and film advance motor 27' associated with film 20 continue to operate at their normal speed until the problem in the appropriate leg of the No. 1 film path is corrected. In like manner, the presence of an excess quantity of film in the portion of the No. 1 film path monitored by looper 60 during A mode operation is corrected for by stoppage of film advance motor 27 until reel 18 has rotated sufficiently to decrease the quantity of film to the desired level. The presence of a deficiency in the desired amount of film monitored by looper 60 during A mode operation is corrected for by momentary stoppage of film advance motor 27' to cause mechanism 38 to retard rotation of reel 18 so that continued operation of motor 27 increases the quantity of film monitored by looper 60 to the desired level.

From the foregoing description, it will be seen that loopers 52 result in the operation of motors 27 and 27' and that, simultaneously and cooperatively therewith, mechanisms 37 and 38 regulate the effect of motors 35 and 36 upon reels 17 and 18 in a coordinated manner which results in maintenance of proper tension levels in both of film lengths 19 and 20, notwithstanding the fact that certain control functions are regulated from only one of the film lengths and other control functions are regulated from the other film length. This ability to regulate the operation of projection system 12 with a division of responsibility between sensing and control functions is possible because of the cowound bifilar relation of film lengths 19 and 20 upon reels 17 and 18.

Upon first threading a pair of film lengths into projection system 12 from reel 17, for example, it may be that one of the film lengths is wound on the reel with greater tension than the other. If such is the case, that film length bearing a greater tension level will tend to shrink during its first passage through the system between the reels. Since it is not known which film length will be the one to shrink, the total capacity of loopers 52 and 60 should be equal to the product of (1) the maximum tolerable strain possible in the film and (2) the length of one of the film lengths, both film lengths preferably being of essentially equal length; it is assumed, in this regard, that one of the film lengths is subject to maximum possible strain and the other film length manifests no strain at all. It is not material which of the film lengths is strained more highly than the other since the cooperative relationship between loopers 52 and 60, on the one hand, and variably effective coupling mechanisms 37 and 28, on the other hand, results in an equalization of the tension in the film lengths after substantially one passage of the film through the system in one direction. Thereafter, loopers 52 and 60 cause only infrequent operation of switches S26–S30.

The cooperation between loopers 52 and 60 and mechanisms 37 and 38 is such that, after tension levels in the films are equalized, the usual case is that looper 52 will respond to a tension condition in film 19 at the same time that looper 60 responds to a slack condition in the same film, and vice versa. This means that the film advance mechanisms for the two film lengths are not operating at precisely synchronous rates. The regulation of motors 27 and 27' according to the principles described above results, in effect, in a shifting of the excess quantity of film present in one looper to the other looper to supply the deficiency sensed at the other looper. It is apparent, therefore, that during normal operating sequences of projection system 12 only one or the other of loopers 52 and 60 is really required to maintain proper operation of the system.

In the foregoing description and in the accompanying drawings, loopers 52 and 60 have been shown associated with a common film length, and control mechanisms 37 and 38 have been shown associated with the other film length. Those skilled in the art to which this invention pertains will realize that looper 60, say, may be interchanged positionally with either of control mechanisms 37 or 38, provided appropriate adjustments are made in the connection of the slack and tension switches of the looper relative to the contacts of relay K6.

With respect to projection station 13, switch S34 is engaged with the portion of the shuttle loop in film path 19 which is most likely to be depleted during reverse mode operation of the projection station, i.e., the portion of the shuttle loop toward reel 18. Switch S34 closes when this portion of the shuttle loop is depleted, thereby energizing relay K14 and completing a circuit through reverse-mode loop restoring solenoid K15. The operation of relay K14 is synchronized with the operation of the corresponding film advance mechanism so that solenoid K15 is operated during the interval when the film advance mechanism is not engaged with the sprocket holes of film length 19 during a film pull-down interval. Elements K14, K15 and S34 of projection station 13 have counterparts in relay K18, solenoid K19 and switch S35 at projection station 14. Which one of the reverse-mode shuttle-loop restoring mechanisms is energized at any one time is controlled by the condition of contacts K8–2.

The schematic illustrations of FIG. 3 show that the projection stations include an optical type audio pickup device which includes, relative to projection station 13, an exciter lamp 231 energized from audio amplifier 160 and a photocell and preamplifier unit 232, the output of which is connected to the input of audio amplifier 160. The output of amplifier 160 is applied via leads 233 and 234 to the input of audio power amplifier 164. Similarly, projection station 14 includes an exciter lamp 235 and a photocell and preamplifier unit 236 coupled to audio amplifier 161 in the same manner as their counterparts in projection station 13. The output of audio amplifier 161 is applied via leads 237 and 238 to the input of the audio power amplifier. Amplifier 164 preferably is a two-channel stereo audio power amplifier, the output of which is supplied via four leads 240, 241, 242 and 243 through the contacts of audio phase reversing relay K9 and pilot intercom override relay K10 to the corresponding terminals of the stereophonic passenger headsets which are associated with those seats located in the viewing area for the display screen associated with optical axes 21 and 22. As described above, contacts K8–7 select for energization that audio amplifier 160 or 161 which is associated with film moving in a forward mode between reels 17 and 18.

Projection lamps 28, 29, 28' and 29' preferably are high voltage lamps such as General Electric Company EJL quartz-halogen lamps which require 200 watt, 24 volt DC energization. Accordingly, the projection lamps associated with projection station 13 are connected to lamp power supply unit 166 via a common lead 245 and separate energization leads 246 and 247, respectively; the projection lamps of projection station 14 are connected to the lamp power supply unit by similar leads 248, 249 and 250, respectively. The selection of which of leads 245 and 247 is energized at any given time for projection station 13 is determined within the lamp supply unit by operation of the high voltage relay therein in response to operation of switch S24, and similarly with respect to the energization of the lamps in projection station 14 in response to operation of switch S25 at such projection station.

There has been described above a novel effective, versatile and efficient control system the presently preferred use of which is in combination with a dual-reel, bifilar wound motion picture projection system in which each of two film lengths is arranged in reciprocal head-to-tail relation and has separate reversible film advance mechanisms for transporting the films between the reels. The control system is arranged to provide as simple a film path configuration as possible, thereby minimizing film wear and enhancing the utility of the projection system. The control system is reliable and provides a trouble-free projection system requiring little or no attention by an operator during the display of a motion picture program.

The structure of the projection system and of the various ways film may be threaded through the system are described in greater detail then herein in a commonly-owned patent application of Patrick M. Powers filed of even date herewith.

Those skilled in the art to which this invention pertains will recognize the novel features and arrangements of the invention, and will also appreciate that the arrangements described above may be altered or modified without departing from the scope of the invention. The foregoing description of specific elements and specific interconnections thereof has been presented for the purposes of example and illustration in furtherance of an explanation of the presently preferred embodiment of the invention, and such description should not be regarded as defining the only form which the invention may take.

What is claimed is:

1. Apparatus for controlling a motion picture projection system comprising:
    a film supply reel;
    a film takeup reel;
    a length of film stored on and extending along a predetermined film path between the film reels;
    a motion picture film projector disposed along the film path and arranged so as to have the film pass in operative projecting relation therethrough;
    first film control means located between the supply reel and the motion picture projector for dynamically storing a portion of the film and for sensing deviations in the film tension to provide a control reaction; and
    second film control means located between the motion picture projector and the takeup reel for dynamically storing a portion of the film and for sensing deviations in the film tension to provide a control reaction.

2. Apparatus according to claim 1 wherein said film control means includes first sensing means for detecting a predetermined increase in film tension; and
    second sensing means for detecting a predetermined decrease in film tension.

3. Apparatus according to claim 2 wherein said first and second control means includes a constant force spring mechanism for maintaining constant tension in the film.

4. Apparatus for controlling a motion picture projection system comprising:
    a film supply reel;
    first film drive means operatively associated with the film supply reel for dispensing film therefrom during apparatus operation;
    a film takeup reel;
    second film drive means operatively associated with the film takeup reel for gathering film during apparatus operation;
    a length of film stored in and extending along a predetermined film path between the film supply and takeup reels during apparatus operation;
    a single motion picture film projector disposed along the film path and arranged so as to have the film pass in operative projecting relation therethrough;
    first film control means located between the film supply reel and the motion picture projector for dynamically storing a portion of the film and for sensing deviations in the film length between the supply reel and the projector to provide a control indication of either a film length excess or deficiency;
    second film control means located between the motion picture projector and the film takeup reel for dynamically storing a portion of the film and for sensing deviations in the film length between the projector and the takeup reel to provide a control indication of either a film length excess or deficiency;
    first means for selectively temporarily adjusting the operation of the first or second film drive means responsive to said first control indications; and
    second means for selectively temporarily adjusting the operation of the first or second film drive means responsive to said second control indication.

5. Apparatus according to claim 4 wherein each of the first and second control means include a biasable film looping mechanism.

* * * * *